United States Patent
Broussard et al.

(10) Patent No.: US 9,070,172 B2
(45) Date of Patent: Jun. 30, 2015

(54) METHOD AND SYSTEM FOR DATA CONTEXT SERVICE

(75) Inventors: Floyd Broussard, The Woodlands, TX (US); Najib Abusalbi, Austin, TX (US)

(73) Assignee: Schlumberger Technology Corporation, Houston, TX (US)

( * ) Notice: Subject to any disclaimer, the term of this patent is extended or adjusted under 35 U.S.C. 154(b) by 1005 days.

(21) Appl. No.: 12/198,780

(22) Filed: Aug. 26, 2008

(65) Prior Publication Data

US 2009/0063230 A1 Mar. 5, 2009

Related U.S. Application Data

(60) Provisional application No. 60/968,304, filed on Aug. 27, 2007.

(51) Int. Cl.
*G06Q 10/00* (2012.01)
*G06Q 50/02* (2012.01)
*G06Q 10/06* (2012.01)

(52) U.S. Cl.
CPC .......... *G06Q 50/02* (2013.01); *G06Q 10/06313* (2013.01); *G06Q 10/06314* (2013.01)

(58) Field of Classification Search
USPC ....................................................... 705/7.12
See application file for complete search history.

(56) References Cited

U.S. PATENT DOCUMENTS

| | | | |
|---|---|---|---|
| 5,992,519 A | 11/1999 | Ramakrishnan et al. | |
| 6,018,497 A | 1/2000 | Gunasekera et al. | |
| 6,078,869 A | 6/2000 | Gunasekera et al. | |
| 6,098,064 A | 8/2000 | Pirolli et al. | |
| 6,106,561 A | 8/2000 | Farmer et al. | |
| 6,230,101 B1 | 5/2001 | Wallis | |
| 6,313,837 B1 | 11/2001 | Assa et al. | |
| 6,633,868 B1 | 10/2003 | Min et al. | |
| 6,826,437 B2 | 11/2004 | Hobbs et al. | |
| 6,980,940 B1 | 12/2005 | Gurpinar et al. | |
| 7,164,990 B2 | 1/2007 | Bratvedt et al. | |
| 7,243,299 B1 | 7/2007 | Rubin et al. | |

(Continued)

FOREIGN PATENT DOCUMENTS

| GB | 2336008 | 10/1999 |
|---|---|---|
| RU | 2297665 C2 | 4/2007 |

(Continued)

OTHER PUBLICATIONS

Dimensions of relevance. Cosjin, Erica; Ingwersen, Peter. Published in Information Processing and Management 36 (2000). pp. 533-550. Accepted to conference Nov. 23, 1999; published 2000.*

(Continued)

*Primary Examiner* — Jacob C. Coppola
(74) *Attorney, Agent, or Firm* — Alec McGinn

(57) ABSTRACT

The invention relates to a method of performing an oilfield operation. The method steps include extracting context information from a host application associated with an oilfield project, sorting the context information into a plurality of dimensions of relevance, generating at least one search profile for each of the plurality of dimensions of relevance, requesting a plurality of searches using the at least one search profile, receiving one or more oilfield data items resulting from the plurality of searches, and selectively adjusting the oilfield operation based on one or more oilfield data items.

19 Claims, 13 Drawing Sheets

(56) References Cited

U.S. PATENT DOCUMENTS

| | | | |
|---|---|---|---|
| 7,284,008 B2 | 10/2007 | Henkin et al. | |
| 7,337,395 B2 | 2/2008 | Reinhardt et al. | |
| 7,584,165 B2 * | 9/2009 | Buchan | 706/60 |
| 7,660,793 B2 * | 2/2010 | Indeck et al. | 707/999.005 |
| 7,680,324 B2 * | 3/2010 | Boncyk et al. | 382/165 |
| 7,814,085 B1 * | 10/2010 | Pfleger et al. | 707/708 |
| 7,870,117 B1 * | 1/2011 | Rennison | 707/706 |
| 7,881,981 B2 * | 2/2011 | Taylor et al. | 705/26.1 |
| 7,895,223 B2 * | 2/2011 | Toebes | 707/758 |
| 7,895,241 B2 | 2/2011 | Schoen et al. | |
| 8,156,131 B2 * | 4/2012 | Marsden et al. | 707/752 |
| 2002/0007348 A1 * | 1/2002 | Ali et al. | 705/51 |
| 2002/0091671 A1 * | 7/2002 | Prokoph | 707/1 |
| 2002/0107735 A1 | 8/2002 | Henkin et al. | |
| 2002/0120505 A1 | 8/2002 | Henkin et al. | |
| 2003/0132934 A1 | 7/2003 | Fremming | |
| 2003/0163213 A1 | 8/2003 | Hobbs et al. | |
| 2003/0195872 A1 * | 10/2003 | Senn | 707/3 |
| 2003/0204494 A1 | 10/2003 | Agrawal et al. | |
| 2003/0212699 A1 | 11/2003 | Denesuk et al. | |
| 2003/0216897 A1 | 11/2003 | Endres et al. | |
| 2004/0153437 A1 * | 8/2004 | Buchan | 707/1 |
| 2004/0216032 A1 | 10/2004 | Amitay et al. | |
| 2004/0220846 A1 | 11/2004 | Cullick et al. | |
| 2005/0034056 A1 | 2/2005 | Rubin et al. | |
| 2005/0060191 A1 * | 3/2005 | Parkins et al. | 705/2 |
| 2005/0149307 A1 | 7/2005 | Gurpinar et al. | |
| 2006/0129366 A1 | 6/2006 | Shaw | |
| 2006/0155699 A1 | 7/2006 | Purvis et al. | |
| 2006/0184329 A1 | 8/2006 | Rowan et al. | |
| 2006/0197759 A1 | 9/2006 | Fremming | |
| 2006/0282784 A1 | 12/2006 | Taylor et al. | |
| 2007/0112547 A1 | 5/2007 | Ghorayeb et al. | |
| 2007/0124220 A1 * | 5/2007 | Griggs et al. | 705/28 |
| 2007/0124296 A1 | 5/2007 | Toebes | |
| 2007/0174275 A1 * | 7/2007 | Kan et al. | 707/5 |
| 2007/0179766 A1 | 8/2007 | Cullick et al. | |
| 2007/0179940 A1 | 8/2007 | Robinson et al. | |
| 2007/0198516 A1 * | 8/2007 | Ganapathy et al. | 707/7 |
| 2008/0016059 A1 | 1/2008 | Henkin et al. | |
| 2008/0016109 A1 | 1/2008 | Henkin et al. | |
| 2008/0114724 A1 | 5/2008 | Indeck et al. | |
| 2008/0133550 A1 * | 6/2008 | Orangi et al. | 707/100 |
| 2008/0172362 A1 * | 7/2008 | Shacham et al. | 707/3 |
| 2009/0063230 A1 | 3/2009 | Broussard et al. | |
| 2009/0083251 A1 | 3/2009 | Sahasrabudhe et al. | |
| 2009/0125367 A1 | 5/2009 | Brink et al. | |
| 2010/0121861 A1 * | 5/2010 | Marsden et al. | 707/752 |

FOREIGN PATENT DOCUMENTS

| | | |
|---|---|---|
| WO | 9964896 | 12/1999 |
| WO | 9967698 | 12/1999 |
| WO | 2004049216 | 6/2004 |
| WO | 2005122001 | 12/2005 |
| WO | 2007022352 A2 | 2/2007 |

OTHER PUBLICATIONS

International Search Report for PCT/US2008/074502 filed Aug. 27, 2008.
The site of "http://vn4.cs.fiu.edu/cgi-bin/arquery.cgi?vid=&y1=1=35.401756&x1=-96.202507&category=newgnis&arcriteria=1&anyfield=Oil+Field&submit.x=53&submit.y=15" Jun. 24, 2007.
The site of "http://terrafly.fiu.edu/" Jun. 24, 2007.
US 7,310,640, Dec. 18, 2007, Purvis et al. (withdrawn).
Finkelstein, L., et al., Placing Search in Context: The Concept Revisited, WWW10, May 2-5, 2001, Hong Kong, 10 pages.
Schutz, F., Outer Context: A not yet Discovered Jewel for Document-Based Information Mining (Abstract), From Proceeding 361 Information and Knowledge Sharing, St. Thomas, US Virgin Islands, Nov. 18-20, 2002, 1 page.
Nakajima, S., Kinoshita, S., and Tanaka, K., Context-Dependent Information Exploration, Eleventh International World Wide Web Conference, May 7-11, 2002, 8 pages.
Broder, A., From Query Based information Retrieval to context driven Information Supply, Yahoo! Research, USA, May 20, 2006, 26 pages.
Su, J. and Lee, M., An Exploration in Personalized and Context-Sensitive Search, Proceedings of the $7^{th}$ annual CLUK research colloquium, Birmingham, England, Jan. 6-7, 2004, 8 pages.
Shen, X., Tan, B., and Zhai, C. X., UCAIR: Capturing and Exploiting Context for Personalized Search, Proceedings of the ACM SIGIR 2005 Workshop on Information Retrieval in Context (IRiX), Salvador, Brazil, Aug. 19, 2005, 3 pages.
Graupmann, J. and Schenkel, R., GeoSpehereSearch: Context-Aware Geographic Web Search, Proceedings of the $3^{rd}$ ACM Workshop on Geographic Information Retrieval, Seattle, Washington, USA, Aug. 10, 2006, 4 pages.
2006 KM Guide, IDM's Knowledge Management Guide for 2006, Image and Data Manager Online, Asia Pacific's Online Resource for Information Management, Australia, 2007, 6 pages.
Examination Report of British application Serial No. GB1000268.1 dated Aug. 1, 2011.
Novelty Search Report issued by the State Intellectual Property Office of the P.R. of China for Gulf Cooperation Council Patent Application No. 2008/11613, mailed Mar. 15, 2012, 6 pages.
Examination Report issued for Russian Patent Application No. 2010111737/08, mailed on Aug. 10, 2012, 3 pages.
Decision on Grant of a Patent for Invention for Russian Patent Application No. 2010111737/08, issued on Mar. 28, 2013, 6 pages.
Office Action issued in CO08089752 on Jun. 4, 2012, 3 pages.
Office Action issued in ARP080103720 on Mar. 4, 2013, 4 pages.
Examination Report issued in CA2695207 on Apr. 19, 2013, 7 pages.
Office Action issued in ARP080103720 on Jun. 12, 2013, 5 pages.
Examination Report issued in CA2695207 on Apr. 24, 2014, 4 pages.

* cited by examiner

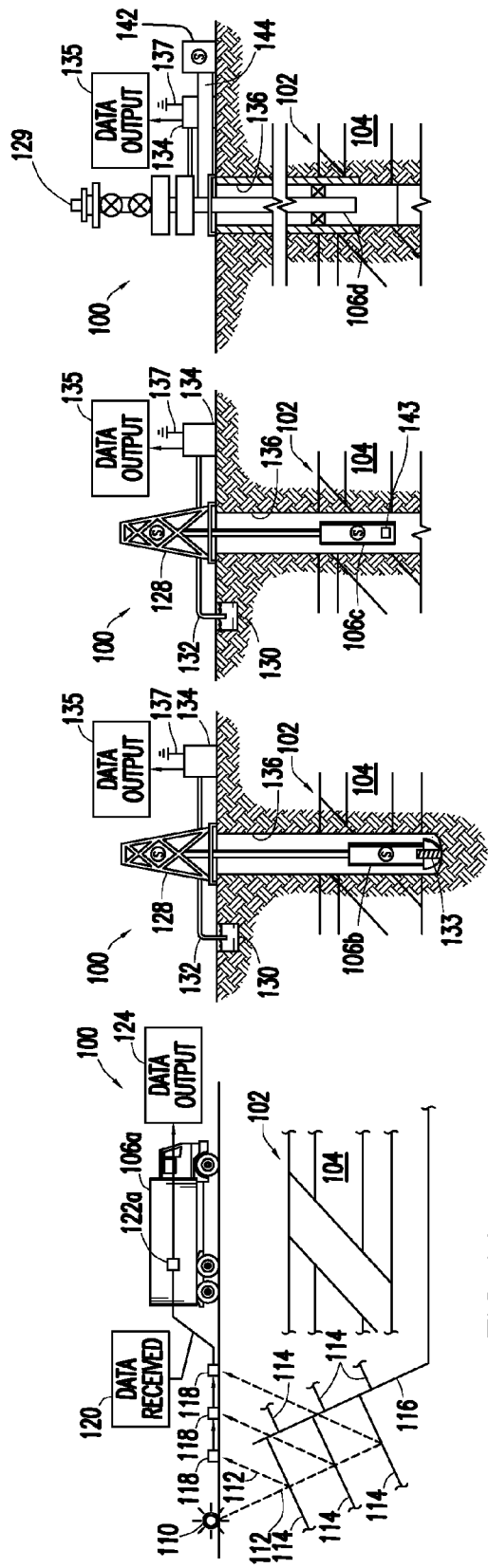

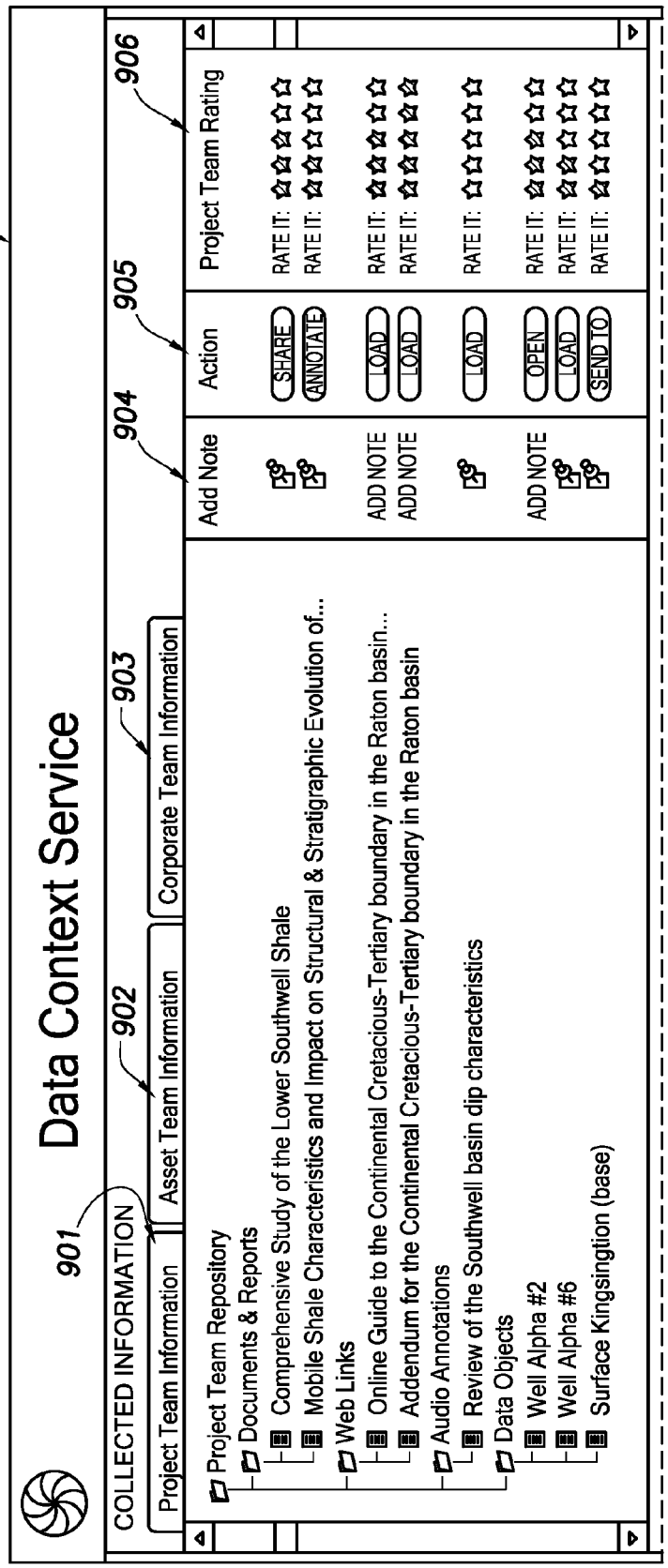

SEARCH RESULTS

| Spatial Proximity (things near here) | Object Context Serach (Information on selected items) | Profile Context | Reference Items |

Current Context: Within 30K of 29°4547"N, 95°2147"W

Search Aperture: ○ ○ ○ ○

Limit search by this context:

| | Relevance | Results | Action |
|---|---|---|---|
| ☑ | 96 | USGS Southwell Shale light sand report | OPEN |
| ☐ | 94 | Marathon Study of the Lower Galveston Basin | LOAD |
| ☐ | 90 | B. McKinney-Obs Report | VIEW |
| ☑ | 84 | TE-25 East Timbalier Island Sediment Restoration, Phase I | OPEN |
| ☐ | 76 | SL 1366 Well Review Information | VIEW |

△ Promote to Collection — 605

◁ Map This

Select the items to add to your collection and press 'Promote to collection' or select the items to map and click 'map this'

Results details — 907
5 out of 5 Results from the following data sources:
Local Project Archive, Asset Archive, USGS Website, Rigzone.com, DCS Archives, GeoIntel Service, IHS data,
See more...

METHOD AND SYSTEM FOR DATA CONTEXT SERVICE

CROSS REFERENCE TO RELATED APPLICATIONS

This application claims priority under 35 U.S.C. §119(e) from Provisional Patent Application No. 60/968,304 filed Aug. 27, 2007.

BACKGROUND OF THE INVENTION

1. Field of the Invention

The present invention relates to techniques for performing oilfield operations relating to subterranean formations having reservoirs therein. More particularly, the invention relates to techniques for performing oilfield operations involving an analysis of reservoir operations and their impact on such oilfield operations.

2. Background of the Related Art

Oilfield operations, such as surveying, drilling, wireline testing, completions, simulation, planning and oilfield analysis, are typically performed to locate and gather valuable downhole fluids. Various aspects of the oilfield and its related operations are shown in FIGS. 1A-1D. As shown in FIG. 1A, surveys are often performed using acquisition methodologies, such as seismic scanners to generate maps of underground structures. These structures are often analyzed to determine the presence of subterranean assets, such as valuable fluids or minerals. This information is used to assess the underground structures and locate the formations containing the desired subterranean assets. Data collected from the acquisition methodologies may be evaluated and analyzed to determine whether such valuable items are present, and if they are reasonably accessible.

As shown in FIG. 1B-1D, one or more wellsites may be positioned along the underground structures to gather valuable fluids from the subterranean reservoirs. The wellsites are provided with tools capable of locating and removing hydrocarbons from the subterranean reservoirs. As shown in FIG. 1B, drilling tools are typically advanced from the oil rigs and into the earth along a given path to locate the valuable downhole fluids. During the drilling operation, the drilling tool may perform downhole measurements to investigate downhole conditions. In some cases, as shown in FIG. 1C, the drilling tool is removed and a wireline tool is deployed into the wellbore to perform additional downhole testing.

After the drilling operation is complete, the well may then be prepared for production. As shown in FIG. 1D, wellbore completions equipment is deployed into the wellbore to complete the well in preparation for the production of fluid therethrough. Fluid is then drawn from downhole reservoirs, into the wellbore and flows to the surface. Production facilities are positioned at surface locations to collect the hydrocarbons from the wellsite(s). Fluid drawn from the subterranean reservoir(s) passes to the production facilities via transport mechanisms, such as tubing. Various equipment may be positioned about the oilfield to monitor oilfield parameters and/or to manipulate the oilfield operations.

During the oilfield operations, data is typically collected for analysis and/or monitoring of the oilfield operations. Such data may include, for example, subterranean formation, equipment, historical and/or other data. Data concerning the subterranean formation is collected using a variety of sources. Such formation data may be static or dynamic. Static data relates to, for example, formation structure and geological stratigraphy that define the geological structure of the subterranean formation. Dynamic data relates to, for example, fluids flowing through the geologic structures of the subterranean formation over time. Such static and/or dynamic data may be collected to learn more about the formations and the valuable assets contained therein.

Sources used to collect static data may be seismic tools, such as a seismic truck that sends compression waves into the earth as shown in FIG. 1A. These waves are measured to characterize changes in the density of the geological structure at different depths. This information may be used to generate basic structural maps of the subterranean formation. Other static measurements may be gathered using core sampling and well logging techniques. Core samples may be used to take physical specimens of the formation at various depths as shown in FIG. 1B. Well logging typically involves deployment of a downhole tool into the wellbore to collect various downhole measurements, such as density, resistivity, etc., at various depths. Such well logging may be performed using, for example, the drilling tool of FIG. 1B and/or the wireline tool of FIG. 1C. Once the well is formed and completed, fluid flows to the surface using production tubing as shown in FIG. 1D. As fluid passes to the surface, various dynamic measurements, such as fluid flow rates, pressure, and composition may be monitored. These parameters may be used to determine various characteristics of the subterranean formation.

Sensors may be positioned about the oilfield to collect data relating to various oilfield operations. For example, sensors in the drilling equipment may monitor drilling conditions, sensors in the wellbore may monitor fluid composition, sensors located along the flow path may monitor flow rates, and sensors at the processing facility may monitor fluids collected. Other sensors may be provided to monitor downhole, surface, equipment or other conditions. The monitored data is often used to make decisions at various locations of the oilfield at various times. Data collected by these sensors may be further analyzed and processed. Data may be collected and used for current or future operations. When used for future operations at the same or other locations, such data may sometimes be referred to as historical data.

The processed data may be used to predict downhole conditions, and make decisions concerning oilfield operations. Such decisions may involve well planning, well targeting, well completions, operating levels, production rates and other operations and/or conditions. Often this information is used to determine when to drill new wells, re-complete existing wells, or alter wellbore production.

Data from one or more wellbores may be analyzed to plan or predict various outcomes at a given wellbore. In some cases, the data from neighboring wellbores or wellbores with similar conditions or equipment may be used to predict how a well will perform. There are usually a large number of variables and large quantities of data to consider in analyzing oilfield operations. It is, therefore, often useful to model the behavior of the oilfield operation to determine the desired course of action. During the ongoing operations, the operating conditions may need adjustment as conditions change and new information is received.

Techniques have been developed to model the behavior of various aspects of the oilfield operations, such as geological structures, downhole reservoirs, wellbores, surface facilities as well as other portions of the oilfield operation. These techniques are typically implemented in an oilfield user application or workflow. Examples of simulation technique that may be used in these user application or workflow are described in U.S. Pat. No. 5,992,519 and WO2004/049216. Other examples of these modeling techniques are shown in U.S. Pat. No. 6,313,837, WO1999/064896, WO2005/

122001, US2003/0216897, US2003/0132934, US2005/0149307, and US2006/0197759.

Recent attempts have been made to consider a broader range of data in oilfield operations. For example, U.S. Pat. No. 6,980,940 to Gurpinar discloses integrated reservoir optimization involving the assimilation of diverse data to optimize overall performance of a reservoir. In another example, WO2004/049216 to Ghorayeb discloses an integrated modeling solution for coupling multiple reservoir simulations and surface facility networks. Other examples of such recent attempts are disclosed in U.S. Pat. No. 6,230,101, U.S. Pat. No. 6,018,497, U.S. Pat. No. 6,078,869, GB2336008, U.S. Pat. No. 6,106,561, US2006/0184329, U.S. Pat. No. 7,164,990, US2004/0220846, and U.S. Ser. No. 10/586,283. Some simulation techniques involve the use of coupled simulations as described, for example, in Publication No. US2006/0129366.

Despite the development and advancement of user applications for wellbore modeling and/or simulation techniques in oilfield operations, currently workers seeking knowledge in the energy industry typically have access to a domain of structured information (data in databases or spreadsheets) and very limited access to unstructured data (reports, presentations, maps, emails, web content, etc. described above). Various studies indicate approximately twenty percent of data used in most businesses are structured data with the remaining eighty percent being unstructured data commonly appearing in memos, notes, news, user groups, chats, reports, letters, surveys, white papers, marketing material, research, presentations and Web pages. In energy (e.g., oil and gas, renewable energies, etc.) industry, more than sixty percent of unstructured data are not managed or used. If the worker uses common search tools for unstructured data such as web content search engines or Electronic Document Management Systems (EDMS) for searching documents and reports, the search results are often unusable because the taxonomy of the search is not relevant to the domain and workflow of the energy industry.

Such search techniques often result in an information overload because far too many results are returned making finding the best information impractical. When important information is found, it is often used once and not maintained for other knowledge users of a similar profile, role, or title to use in future workflows. Users often do not share such information with others within the immediate team who could benefit from the information. Lastly, no easy way exists for the user to rank the relative value of the data, in conjunction with their workflow, role, and data. Therefore, a need exists to provide techniques capable of performing searches of the oilfield data having both structured and unstructured formats from within a user/host application, and to return search results that are more relevant to the context of the oilfield project, the user/host application used by the project, and the user using the application.

It would be desirable to have a system capable of extracting context information using configurable search modules to address different context information categories. In some cases, it may be desirable to selectively link or couple certain modules so that a combined search profile may be established. In other cases, it may be desirable to limit or adjust the scope of the search under user control. It is further desirable that such techniques be capable of one of more of the following, among others: activating the search from within an application; selectively applying the search results for an application; and sharing the search results between different projects or workflows.

SUMMARY OF THE INVENTION

In general, in one aspect, the invention relates to a method of performing an oilfield operation. The method steps include extracting context information from a host application associated with an oilfield project, sorting the context information into a plurality of dimensions of relevance, generating at least one search profile for each of the plurality of dimensions of relevance, requesting a plurality of searches using the at least one search profile, receiving one or more oilfield data items resulting from the plurality of searches, and selectively adjusting the oilfield operation based on one or more oilfield data items.

In general, in one aspect, the invention relates to a system for performing an oilfield operation. The system includes a host application associated with an oilfield project, a context data engine operatively connected to the host application, wherein the context data engine is configured to extract context information from the host application and sort the context information into a plurality of dimensions of relevance, a plurality of appliances configured to perform a plurality of searches based on at least one search profile generated from the plurality of dimensions of relevance, and apparatus for adjusting the oilfield operation based on one or more oilfield data items resulting from at least one of the plurality of searches.

In general, in one aspect, the invention relates to a computer readable medium storing instructions for performing an oilfield operation. The instructions include functionality to extract context information from a host application associated with an oilfield project, sort the context information into a plurality of dimensions of relevance, generate at least one search profile for each of the plurality of dimensions of relevance, request a plurality of searches using the at least one search profile, and receive one or more oilfield data items resulting from the plurality of searches.

Other aspects and advantages of the invention will be apparent from the following description and the appended claims.

BRIEF DESCRIPTION OF DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIGS. 1A-1D show exemplary schematic views of an oilfield having subterranean structures including reservoirs therein and various oilfield operations being performed on the oilfield. FIG. 1A depicts an exemplary survey operation being performed by a seismic truck. FIG. 1B depicts an exemplary drilling operation being performed by a drilling tool suspended by a rig and advanced into the subterranean formation. FIG. 1C depicts an exemplary wireline operation being performed by a wireline tool suspended by the rig and into the wellbore of FIG. 1B. FIG. 1D depicts an exemplary simulation operation being performed by a simulation tool being deployed from the rig and into a completed wellbore for drawing fluid from the downhole reservoir into a surface facility.

FIGS. 2A-2D are exemplary graphical depictions of data collected by the tools of FIGS. 1A-1D, respectively. FIG. 2A depicts an exemplary seismic trace of the subterranean formation of FIG. 1A. FIG. 2B depicts exemplary core sample of the formation shown in FIG. 1B. FIG. 2C depicts an exemplary well log of the subterranean formation of FIG. 1C. FIG. 2D depicts an exemplary simulation decline curve of fluid flowing through the subterranean formation of FIG. 1D.

FIGS. 8a, 8b, and 9 show an exemplary screen shots of data context service windows in different configurations.

DETAILED DESCRIPTION OF THE INVENTION

Figure 3:
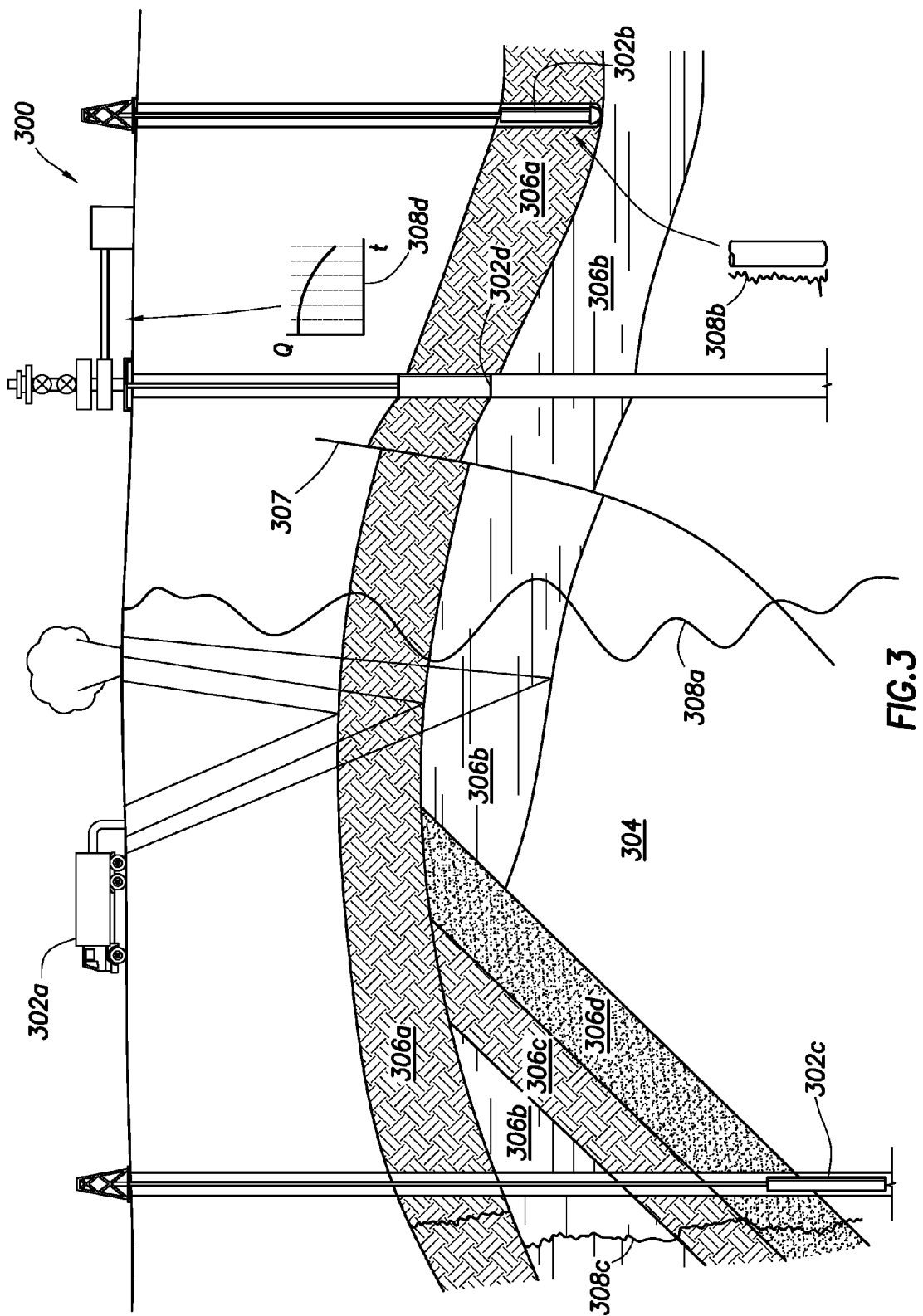
FIG. 3 shows an exemplary schematic view, partially in cross section, of an oilfield having a plurality of data acquisition tools positioned at various locations along the oilfield for collecting data from the subterranean formation.

Presently preferred embodiments of the invention are shown in the above-identified figures and described in detail below. In describing the preferred embodiments, like or identical reference numerals are used to identify common or similar elements. The figures are not necessarily to scale and certain features and certain views of the figures may be shown exaggerated in scale or in schematic in the interest of clarity and conciseness.

FIGS. 1A-D show an oilfield (100) having geological structures and/or subterranean formations therein. As shown in these figures, various measurements of the subterranean formation are taken by different tools at the same location. These measurements may be used to generate information about the formation and/or the geological structures and/or fluids contained therein.

FIGS. 1A-1D depict schematic views of an oilfield (100) having subterranean formations (102) containing a reservoir (104) therein and depicting various oilfield operations being performed on the oilfield (100). FIG. 1A depicts a survey operation being performed by a seismic truck (106a) to measure properties of the subterranean formation. The survey operation is a seismic survey operation for producing sound vibration(s) (112). In FIG. 1A, one such sound vibration (112) is generated by a source (110) and reflects off a plurality of horizons (114) in an earth formation (116). The sound vibration(s) (112) is (are) received in by sensors (S), such as geophone-receivers (118), situated on the earth's surface, and the geophone-receivers (118) produce electrical output signals, referred to as data received (120) in FIG. 1.

In response to the received sound vibration(s) (112) representative of different parameters (such as amplitude and/or frequency) of the sound vibration(s) (112). The data received (120) is provided as input data to a computer (122a) of the seismic recording truck (106a), and responsive to the input data, the recording truck computer (122a) generates a seismic data output record (124). The seismic data may be further processed as desired, for example by data reduction.

FIG. 1B depicts a drilling operation being performed by a drilling tool (106b) suspended by a rig (128) and advanced into the subterranean formation (102) to form a wellbore (136). A mud pit (130) is used to draw drilling mud into the drilling tool (106b) via flow line (132) for circulating drilling mud through the drilling tool (106b) and back to the surface. The drilling tool (106b) is advanced into the formation to reach reservoir (104). The drilling tool (106b) is preferably adapted for measuring downhole properties. The drilling tool (106b) may also be adapted for taking a core sample (133) as shown, or removed so that a core sample (133) may be taken using another tool.

A surface unit (134) is used to communicate with the drilling tool (106b) and offsite operations. The surface unit (134) is capable of communicating with the drilling tool (106b) to send commands to drive the drilling tool (106b), and to receive data therefrom. The surface unit (134) is preferably provided with computer facilities for receiving, storing, processing, and analyzing data from the oilfield (100). The surface unit (134) collects data output (135) generated during the drilling operation. Computer facilities, such as those of the surface unit (134), may be positioned at various locations about the oilfield (100) and/or at remote locations.

Sensors (S), such as gauges, may be positioned throughout the reservoir, rig, oilfield equipment (such as the downhole tool), or other portions of the oilfield for gathering information about various parameters, such as surface parameters, downhole parameters, and/or operating conditions. These sensors (S) preferably measure oilfield parameters, such as weight on bit, torque on bit, pressures, temperatures, flow rates, compositions and other parameters of the oilfield operation.

The information gathered by the sensors (S) may be collected by the surface unit (134) and/or other data collection sources for analysis or other processing. The data collected by the sensors (S) may be used alone or in combination with other data. The data may be collected in a database and all or select portions of the data may be selectively used for analyzing and/or predicting oilfield operations of the current and/or other wellbores.

Data outputs from the various sensors (S) positioned about the oilfield may be processed for use. The data may be historical data, real time data, or combinations thereof. The real time data may be used in real time, or stored for later use. The data may also be combined with historical data or other inputs for further analysis. The data may be housed in separate databases, or combined into a single database.

The collected data may be used to perform analysis, such as modeling operations. For example, the seismic data output may be used to perform geological, geophysical, reservoir engineering, and/or production simulations. The reservoir, wellbore, surface and/or process data may be used to perform reservoir, wellbore, or other production simulations. The data outputs from the oilfield operation may be generated directly from the sensors (S), or after some preprocessing or modeling. These data outputs may act as inputs for further analysis.

The data is collected and stored at the surface unit (134). One or more surface units (134) may be located at the oilfield (100), or linked remotely thereto. The surface unit (134) may be a single unit, or a complex network of units used to perform the necessary data management functions throughout the oilfield (100). The surface unit (134) may be a manual or automatic system. The surface unit (134) may be operated and/or adjusted by a user.

The surface unit (134) may be provided with a transceiver (137) to allow communications between the surface unit (134) and various portions (or regions) of the oilfield (100) or other locations. The surface unit (134) may also be provided with or functionally linked to a controller for actuating mechanisms at the oilfield (100). The surface unit (134) may then send command signals to the oilfield (100) in response to data received. The surface unit (134) may receive commands via the transceiver or may itself execute commands to the controller. A processor may be provided to analyze the data (locally or remotely) and make the decisions to actuate the controller. In this manner, the oilfield (100) may be selectively adjusted based on the data collected to optimize fluid recovery rates, or to maximize the longevity of the reservoir and its ultimate production capacity. These adjustments may be made automatically based on computer protocol, or manually by an operator. In some cases, well plans may be adjusted to select optimum operating conditions, or to avoid problems.

FIG. 1C depicts a wireline operation being performed by a wireline tool (106c) suspended by the rig (128) and into the wellbore (136) of FIG. 1B. The wireline tool (106c) is preferably adapted for deployment into a wellbore (136) for performing well logs, performing downhole tests and/or collecting samples. The wireline tool (106c) may be used to provide another method and apparatus for performing a seismic survey operation. The wireline tool (106c) of FIG. 1C may have an explosive or acoustic energy source (143) that provides electrical signals to the surrounding subterranean formations (102).

The wireline tool (106c) may be operatively linked to, for example, the geophones (118) stored in the computer (122a) of the seismic recording truck (106a) of FIG. 1A. The wireline tool (106c) may also provide data to the surface unit (134). As shown data output (135) is generated by the wireline tool (106c) and collected at the surface. The wireline tool (106c) may be positioned at various depths in the wellbore (136) to provide a survey of the subterranean formation.

FIG. 1D depicts a production operation being performed by a production tool (106d) deployed from a production unit or Christmas tree (129) and into the completed wellbore (136) of FIG. 1C for drawing fluid from the downhole reservoirs into the surface facilities (142). Fluid flows from reservoir (104) through perforations in the casing (not shown) and into the production tool (106d) in the wellbore (136) and to the surface facilities (142) via a gathering network (146).

Sensors (S), such as gauges, may be positioned about the oilfield to collect data relating to various oilfield operations as described previously. As shown, the sensor (S) may be positioned in the production tool (106d) or associated equipment, such as the Christmas tree, gathering network, surface facilities and/or the production facility, to measure fluid parameters, such as fluid composition, flow rates, pressures, temperatures, and/or other parameters of the production operation.

While only simplified wellsite configurations are shown, it will be appreciated that the oilfield may cover a portion of land, sea and/or water locations that hosts one or more wellsites. Production may also include injection wells (not shown) for added recovery. One or more gathering facilities may be operatively connected to one or more of the wellsites for selectively collecting downhole fluids from the wellsite (s).

While FIGS. 1B-1D depict tools used to measure properties of an oilfield (100), it will be appreciated that the tools may be used in connection with non-oilfield operations, such as mines, aquifers, storage or other subterranean facilities. Also, while certain data acquisition tools are depicted, it will be appreciated that various measurement tools capable of sensing parameters, such as seismic two-way travel time, density, resistivity, production rate, etc., of the subterranean formation and/or its geological formations may be used. Various sensors (S) may be located at various positions along the wellbore and/or the monitoring tools to collect and/or monitor the desired data. Other sources of data may also be provided from offsite locations.

The oilfield configuration in FIGS. 1A-1D are intended to provide a brief description of an example of an oilfield usable with the present invention. Part, or all, of the oilfield (100) may be on land and/or sea. Also, while a single oilfield measured at a single location is depicted, the present invention may be utilized with any combination of one or more oilfields (100), one or more processing facilities and one or more wellsites.

FIG. 1D depicts a production operation being performed by a production tool (106d) deployed from the rig (128) and into the completed wellbore (136) of FIG. 1C for drawing fluid from the downhole reservoirs into surface facilities (142). Fluid flows from reservoir (104) through wellbore (136) and to the surface facilities (142) via a surface network (144). Sensors (S) positioned about the oilfield (100) are operatively connected to a surface unit (142) for collecting data therefrom. During the production process, data output (135) may be collected from various sensors (S) and passed to the surface unit (134) and/or processing facilities. This data may be, for example, reservoir data, wellbore data, surface data, and/or process data.

While FIGS. 1A-1D depict monitoring tools used to measure properties of an oilfield (100), it will be appreciated that the tools may be used in connection with non-oilfield operations, such as mines, aquifers or other subterranean facilities. Also, while certain data acquisition tools are depicted, it will be appreciated that various measurement tools capable of sensing properties, such as seismic two-way travel time, density, resistivity, production rate, etc., of the subterranean formation and/or its geological structures may be used. Various sensors (S) may be located at various positions along the subterranean formation and/or the monitoring tools to collect and/or monitor the desired data. Other sources of data may also be provided from offsite locations.

The oilfield configuration in FIGS. 1A-1D is not intended to limit the scope of the invention. Part, or all, of the oilfield (100) may be on land and/or sea. Also, while a single oilfield at a single location is depicted, the present invention may be used with any combination of one or more oilfields (100), one or more processing facilities and one or more wellsites. Additionally, while only one wellsite is shown, it will be appreciated that the oilfield (100) may cover a portion of land that hosts one or more wellsites. One or more gathering facilities may be operatively connected to one or more of the wellsites for selectively collecting downhole fluids from the wellsite (s).

FIGS. 2A-2D are graphical depictions of data collected by the tools of FIGS. 1A-D, respectively. FIG. 2A depicts a seismic trace (202) of the subterranean formation of FIG. 1A taken by survey tool (106a). The seismic trace measures a two-way response over a period of time. FIG. 2B depicts a core sample (133) taken by the drilling tool (106b). The core test typically provides a graph of the density, resistivity, or other physical property of the core sample (133) over the length of the core. Tests for density and viscosity are often performed on the fluids in the core at varying pressures and temperatures. FIG. 2C depicts a well log (204) of the subterranean formation of FIG. 1C taken by the wireline tool (106c). The wireline log typically provides a resistivity measurement of the formation at various depths. FIG. 2D depicts a production decline curve (206) of fluid flowing through the subterranean formation of FIG. 1D taken by the production tool (016d). The production decline curve (206) typically provides the production rate Q as a function of time t.

The respective graphs of FIGS. 2A-2C contain static measurements that describe the physical characteristics of the formation. These measurements may be compared to determine the accuracy of the measurements and/or for checking for errors. In this manner, the plots of each of the respective measurements may be aligned and scaled for comparison and verification of the properties.

FIG. 2D provides a dynamic measurement of the fluid properties through the wellbore. As the fluid flows through the wellbore, measurements are taken of fluid properties, such as flow rates, pressures, composition, etc. As described below, the static and dynamic measurements may be used to generate models of the subterranean formation to determine characteristics thereof.

FIG. 3 is a schematic view, partially in cross section of an oilfield (300) having data acquisition tools (302a), (302b), (302c), and (302d) positioned at various locations along the oilfield for collecting data of a subterranean formation (304). The data acquisition tools (302a-302d) may be the same as data acquisition tools (106a-106d) of FIG. 1, respectively. As shown, the data acquisition tools (302a-302d) generate data plots or measurements (308a-308d), respectively.

Data plots (308a-308c) are examples of static data plots that may be generated by the data acquisition tools (302a-302d), respectively. Static data plot (308a) is a seismic two-way response time and may be the same as the seismic trace (202) of FIG. 2A. Static plot (308b) is core sample data measured from a core sample of the formation (304), similar to the core sample (133) of FIG. 2B. Static data plot (308c) is a logging trace, similar to the well log (204) of FIG. 2C. Data plot (308d) is a dynamic data plot of the fluid flow rate over time, similar to the graph (206) of FIG. 2D. Other data may also be collected, such as historical data, user inputs, economic information, other measurement data, and other parameters of interest.

The subterranean formation (304) has a plurality of geological structures (306a-306d). As shown, the formation has a sandstone layer (306a), a limestone layer (306b), a shale layer (306c), and a sand layer (306d). A fault line (307) extends through the formation. The static data acquisition tools are preferably adapted to measure the formation and detect the characteristics of the geological structures of the formation.

While a specific subterranean formation (304) with specific geological structures are depicted, it will be appreciated that the formation may contain a variety of geological structures. Fluid may also be present in various portions of the formation (304). Each of the measurement devices may be used to measure properties of the formation (304) and/or its underlying structures. While each acquisition tool is shown as being in specific locations along the formation (304), it will be appreciated that one or more types of measurement may be taken at one or more location across one or more oilfields or other locations for comparison and/or analysis.

The data collected from various sources, such as the data acquisition tools of FIG. 3, may then be evaluated. Typically, seismic data displayed in the static data plot (308a) from the data acquisition tool (302a) is used by a geophysicist to determine characteristics of the subterranean formation (304). Core data shown in static plot (308b) and/or log data from the well log (308c) is typically used by a geologist to determine various characteristics of the geological structures of the subterranean formation (304). Production data from the production graph (308d) is typically used by the reservoir engineer to determine fluid flow reservoir characteristics.

Figure 4:
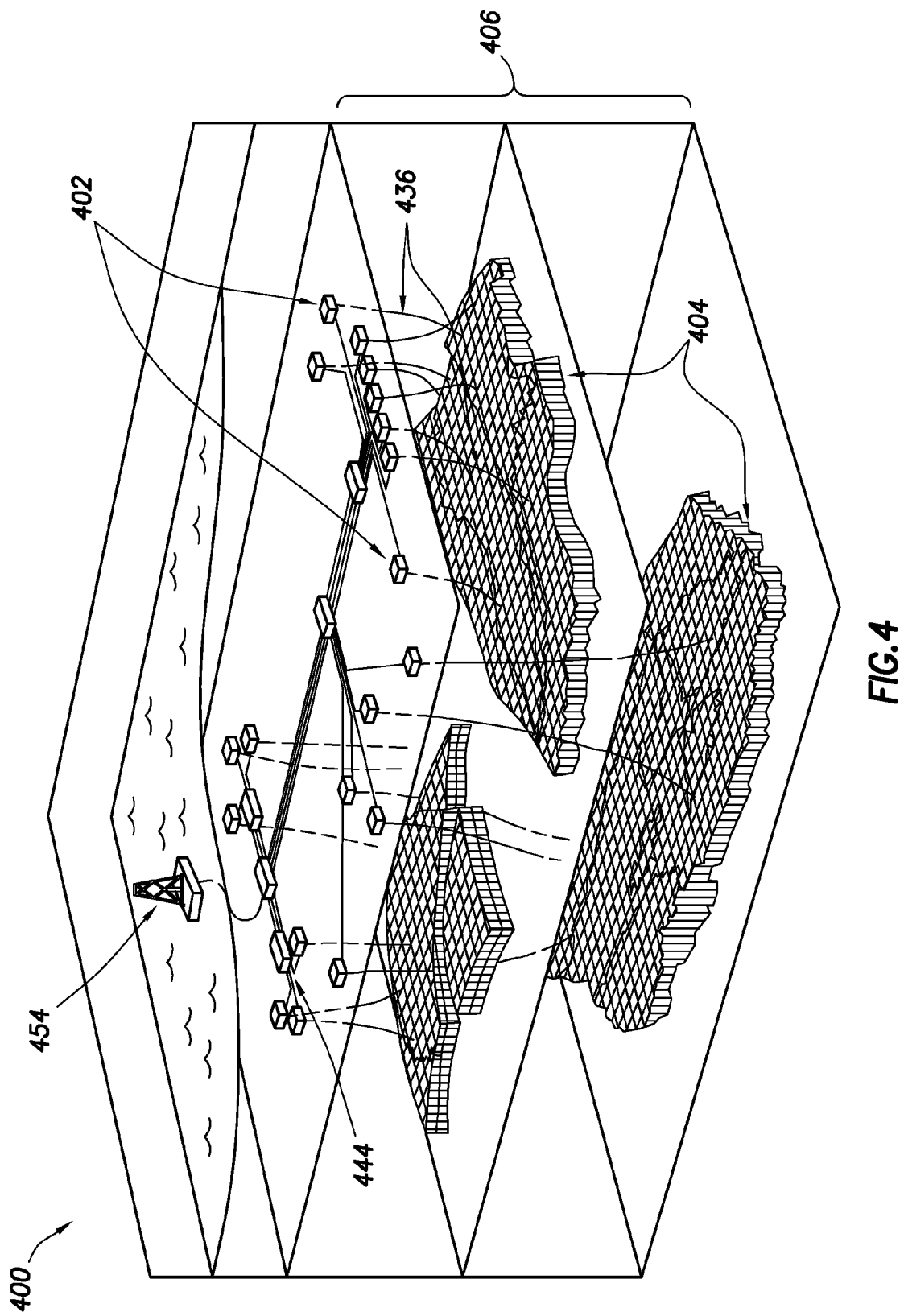
FIG. 4 shows an exemplary schematic view of an oilfield having a plurality of wellsites for producing hydrocarbons from the subterranean formation.

FIG. 4 shows an oilfield (400) for performing simulation operations. As shown, the oilfield has a plurality of wellsites (402) operatively connected to a central processing facility (454). The oilfield configuration of FIG. 4 is not intended to limit the scope of the invention. Part or all of the oilfield (400) may be on land and/or sea. Also, while a single oilfield with a single processing facility and a plurality of wellsites is depicted, any combination of one or more oilfields, one or more processing facilities and one or more wellsites (402) may be present.

Each wellsite (402) has equipment that forms a wellbore (436) into the earth. The wellbores extend through subterranean formations (406) including reservoirs (404). These reservoirs (404) contain fluids, such as hydrocarbons. The wellsites draw fluid from the reservoirs and pass them to the processing facilities via surface networks (444). The surface networks (444) have tubing and control mechanisms for controlling the flow of fluids from the wellsite to the processing facility (454).

Figure 5:
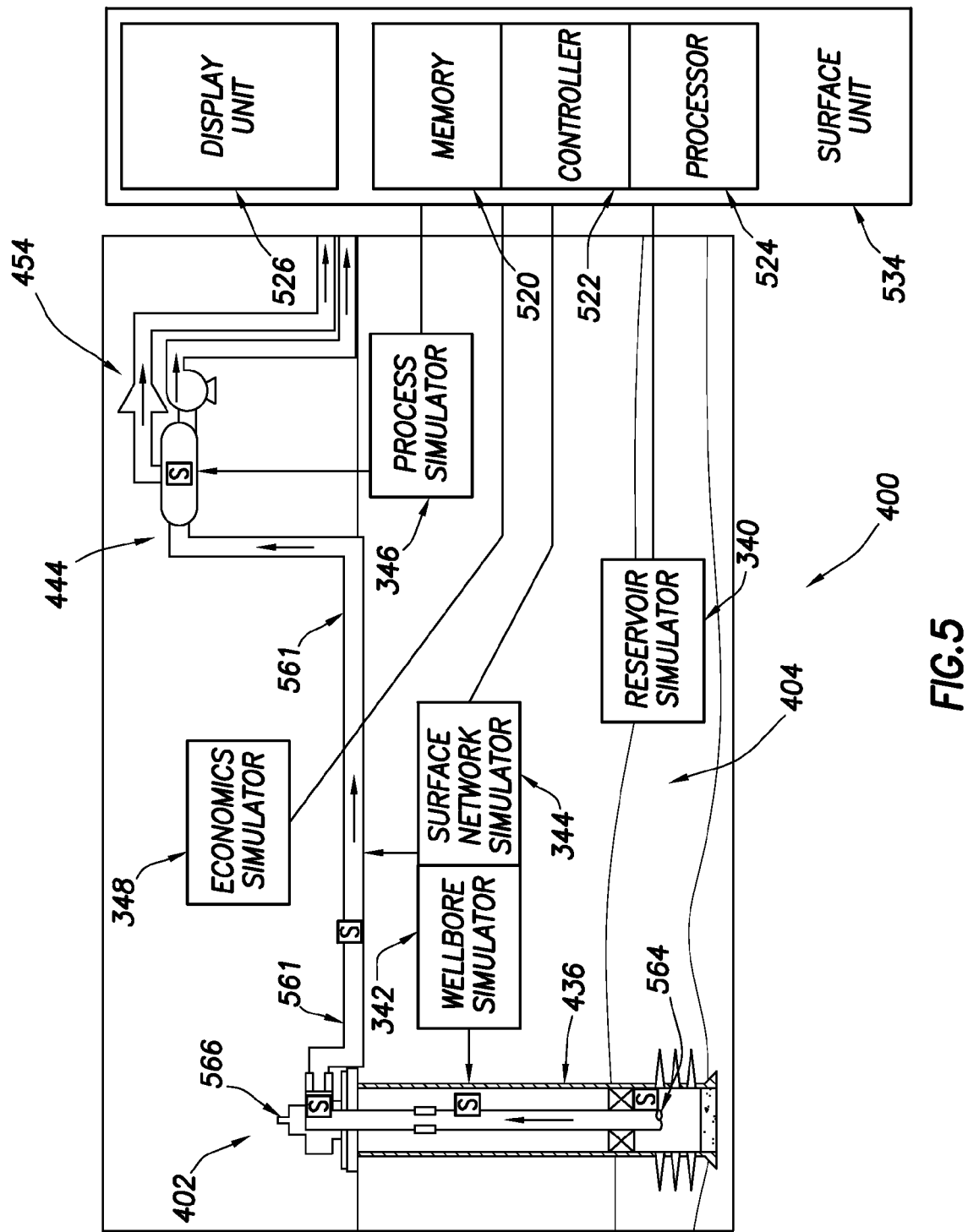
FIG. 5 shows an exemplary schematic diagram of a portion of the oilfield of FIG. 4 depicting the simulation operation in detail.

FIG. 5 shows a schematic view of a portion (or region) of the oilfield (400) of FIG. 4, depicting a producing wellsite (402) and surface network (444) in detail. The wellsite (402) of FIG. 5 has a wellbore (436) extending into the earth therebelow. As shown, the wellbores (436) has already been drilled, completed, and prepared for production from reservoir (404).

Wellbore production equipment (564) extends from a wellhead (566) of wellsite (402) and to the reservoir (404) to draw fluid to the surface. The wellsite (402) is operatively connected to the surface network (444) via a transport line (561). Fluid flows from the reservoir (404), through the wellbore (436), and onto the surface network (444). The fluid then flows from the surface network (444) to the process facilities (454).

As further shown in FIG. 5, sensors (S) are located about the oilfield (400) to monitor various parameters during oilfield operations. The sensors (S) may measure, for example, pressure, temperature, flow rate, composition, and other parameters of the reservoir, wellbore, surface network, process facilities and/or other portions (or regions) of the oilfield operation. These sensors (S) are operatively connected to a surface unit (534) for collecting data therefrom. The surface unit may be, for example, similar to the surface unit (134) of FIGS. 1A-D.

One or more surface units (534) may be located at the oilfield (400), or linked remotely thereto. The surface unit (534) may be a single unit, or a complex network of units used to perform the necessary data management functions throughout the oilfield (400). The surface unit (534) may be a manual or automatic system. The surface unit (534) may be operated and/or adjusted by a user. The surface unit (534) is adapted to receive and store data. The surface unit (534) may also be equipped to communicate with various oilfield equipment (not shown). The surface unit (534) may then send command signals to the oilfield (400) in response to data received or modeling performed.

As shown in FIG. 5, the surface unit (534) has computer facilities, such as memory (520), controller (522), processor (524), and display unit (526), for managing the data. The data is collected in memory (520), and processed by the processor (524) for analysis. Data may be collected from the oilfield sensors (S) and/or by other sources. For example, oilfield data may be supplemented by historical data collected from other operations or user inputs. Oilfield data may also be referred to as data items, which may include a piece of data related to the oilfield, meta data associated with oilfield data, structured data, unstructured data, The analyzed data (e.g., based on modeling performed) may then be used to make decisions. A transceiver (not shown) may be provided to allow communications between the surface unit (534) and the oilfield (400). The controller (522) may be used to actuate mechanisms at the oilfield (400) via the transceiver and based on these decisions. In this manner, the oilfield (400) may be selectively adjusted based on the data collected. These adjustments may be made automatically based on computer protocol and/or manually by an operator. In some cases, well plans are adjusted to select optimum operating conditions or to avoid problems.

To facilitate the processing and analysis of data, simulators may be used to process the data for modeling various aspects of the oilfield operation. Specific simulators are often used in connection with specific oilfield operations, such as reservoir or wellbore simulation. Data fed into the simulator(s) may be historical data, real time data or combinations thereof. Simulation through one or more of the simulators may be repeated or adjusted based on the data received.

As shown, the oilfield operation is provided with wellsite and non-wellsite simulators. The wellsite simulators may include a reservoir simulator (340), a wellbore simulator (342), and a surface network simulator (344). The reservoir simulator (340) solves for hydrocarbon flow through the reservoir rock and into the wellbores. The wellbore simulator (342) and surface network simulator (344) solves for hydrocarbon flow through the wellbore and the surface network (444) of pipelines. As shown, some of the simulators may be separate or combined, depending on the available systems.

The non-wellsite simulators may include process (346) and economics (348) simulators. The processing unit has a process simulator (346). The process simulator (346) models the processing plant (e.g., the process facilities (454)) where the hydrocarbon(s) is/are separated into its constituent components (e.g., methane, ethane, propane, etc.) and prepared for sales. The oilfield (400) is provided with an economics simulator (348). The economics simulator (348) models the costs of part or the entire oilfield (400) throughout a portion or the entire duration of the oilfield operation. Various combinations of these and other oilfield simulators may be provided.

Figure 6A:
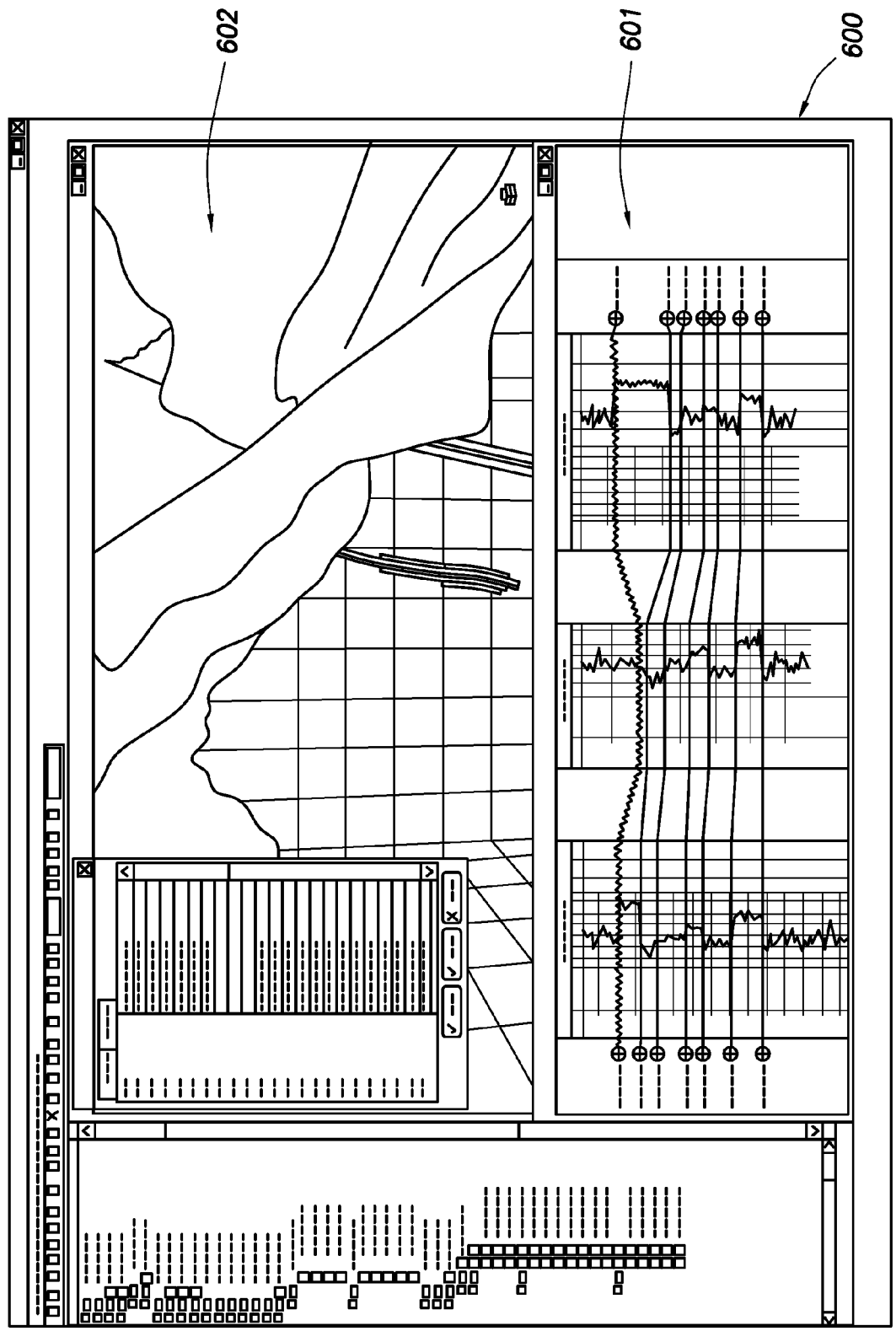
FIG. 6a depicts an exemplary screen shot of a user application used by an oilfield operation project.

FIG. 6a shows a host application (600) used by an oilfield project in accordance with one or more embodiments of the invention. The host application (600) may be a simulator (e.g., a wellsite simulator, a non-wellsite simulator) as discussed above in reference to FIG. 5, or any other host application (600) used by the oilfield project. Further, a host application may involve actions (e.g., search, quality control, data tagging, etc.) performed within the host application itself or any action performed in the environment of the host application. For example, the host application may be the application executing within an operating system and the context is determined within the particular host application. Further, the host application may be an interface (such as a pop-up window, toolbar, or other interface) operating within the operating system environment with various one or more third-party applications (but not necessarily as an interface within a third-party application). Initially, the term "context" points to the part of a text or statement that surrounds a particular word or passage and determines its meaning. In general, the term "context" describes a setting or circumstances in which an event occurs. For example, the event may be a search or other access to oilfield data while the setting or circumstances may relate to aspects of performing oilfield operations. In one or more embodiments of the invention, the context information may be categorized into context information categories according to these aspects such as the identity or profile of a user, an asset/project location or workflow associated with the oilfield operations, oilfield data with which the user is working, etc.

As shown in FIG. 6a, the host application (600) may include a three dimensional (3D) display (602), which depicts a wellbore penetrating a subterranean formation for extracting fluid from an underground reservoir. The host application (600) may also include a data log (601) showing various geophysical parameters obtained from various sensors disposed about the wellbore, the subterranean formation, the underground reservoir, or any other portion of the oilfield. In one or more embodiments of the invention, a host application (600) may be a geoscience application used for reservoir engineering where a user (e.g.) a geoscientist) may need to verify information from the data log (601) by searching or otherwise accessing different sources of data (not shown).

Figure 6B:
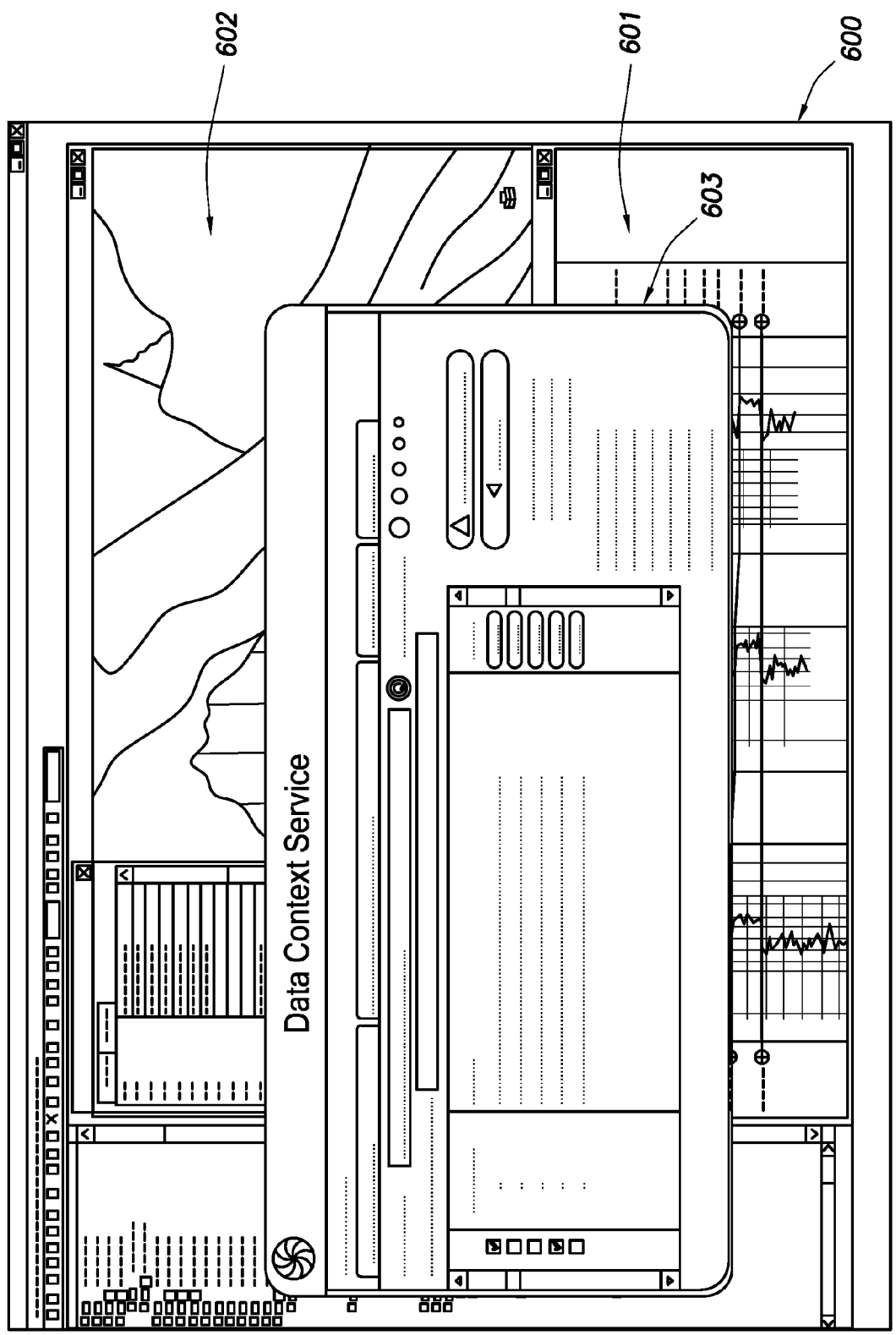
FIG. 6b depicts an exemplary screen shot of a user application with a data context service window.

FIG. 6b shows a data context service window (603) launched from and displayed within the host application (600) (or associated environment, as discussed above) in accordance with one or more embodiments of the invention. The data context service window (603) may present the results (i.e., oilfield data items such as relevant documents, files, reports, web content, etc.) from various searches performed based on context information extracted from the host application (600). The data context service window (603) may be activated from within the host application (600) so that the search results may be applied within the host application (600) directly. The activation may be performed manually or automatically based on certain conditions detected within the host application (600). More details of the data context service window (603) are described below.

Figure 7A:
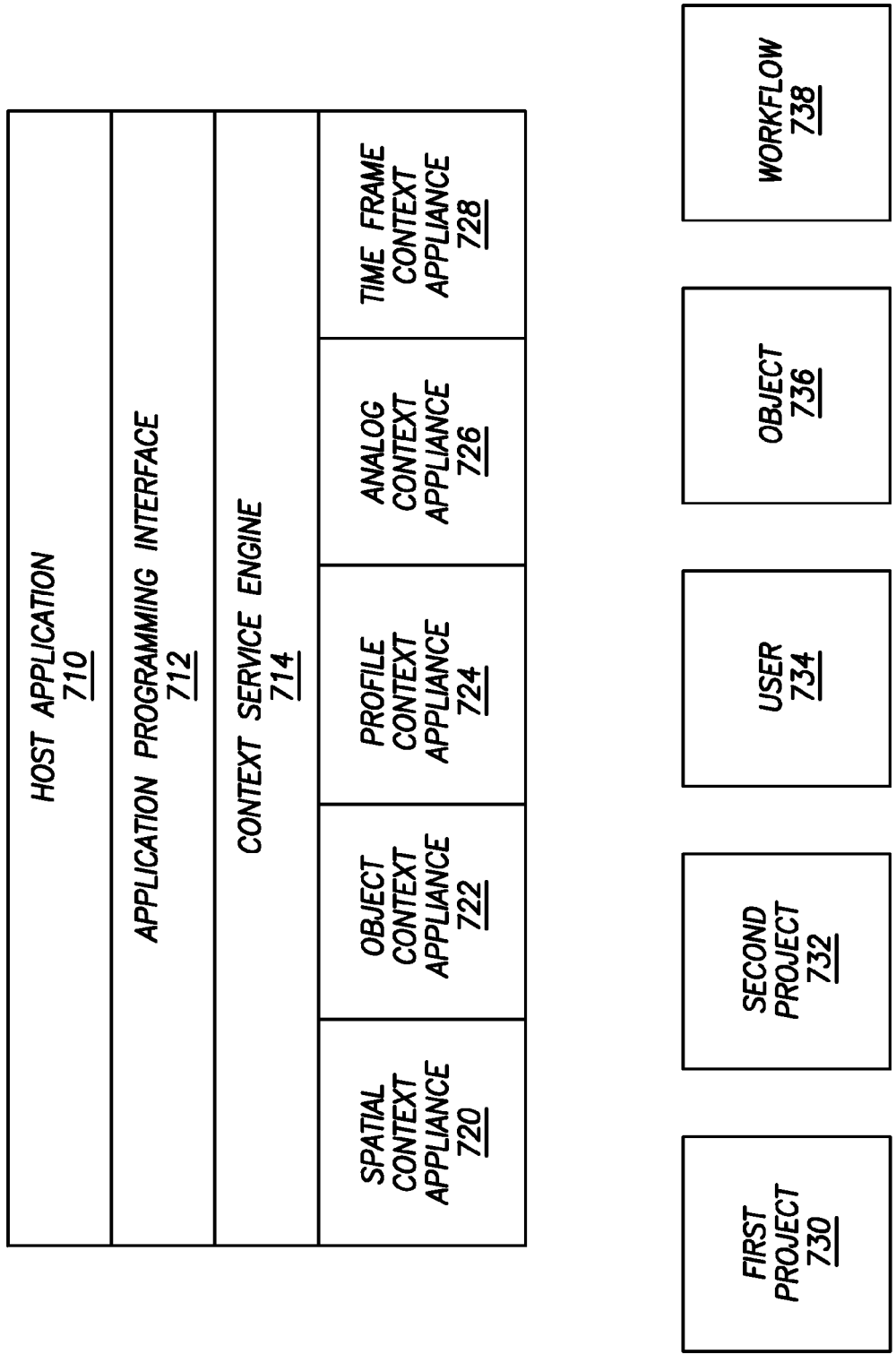
FIG. 7a shows an exemplary schematic diagram of using the data context service in performing the oilfield operation.

FIG. 7a shows an exemplary schematic diagram of the data context service in performing the oilfield operation in accordance with one or more embodiments of the invention. FIG. 7a includes a host application (710), an application programming interface (712), a context service engine (714), multiple context appliances (720)-(728), a project (not shown), a user (734), an object (736), and a workflow (738). The project (not shown) may be one of many projects (e.g., the first project (730), the second project (732), or the combination thereof).

The host application (710) corresponds to the host application (600) as shown in FIGS. 6a and 6b above. The host application (710) may be used by the project (not shown) as part of a workflow, such as the workflow (738). The workflow (738) may include multiple host applications executed in a pre-determined order to perform the oilfield operation associated with the project (not shown).

The workflow (738) may be a current workflow where the associated host application (710) is being executed or a previous workflow of the project (not shown) completed in the past. The workflow (738) may be associated with a workflow name, a role of the workflow, and a workflow date. The workflow date may relate to a date when the workflow is performed. The user (734) may be a member of the project (not shown) and be associated with a title and/or role for the project (not shown).

In addition, the project (not shown) may be associated with a project name, a role of the project, a project location, a project date, and/or an object such as the object (736). The project date may relate to a starting date, a current date, or a scheduled date of the oilfield operation. The object (736) may be a wellbore, a subterranean formation, a underground reservoir, or any other portion of an oilfield, such as depicted in FIGS. 6a and 6b above. The object (736) may be associated with an object location, an object date, an object name, a serial number, or other identifications of the object. The object date may relate to a event associated with the object (736) such as a date of geological survey, drilling, completion, production, etc.

The application programming interface (712) provides functionality to configure and activate the context service engine (714) to obtain search results based on context information associated with the oilfield operation project, such as the first project (730) and/or the second project (732).

The context service engine (714) may be coupled to multiple context appliances, such as the spatial context appliance (720), the object context appliance (722), the profile context appliance (724), the analog context appliance (726), and the time frame context appliance (728). Each of the context appliances is configured to provide functionality for obtaining search results based on a corresponding context information category, such as spatial context, the object context, profile context, analog context, and time frame context. In one or more embodiments of the invention, a context information category is referred to as a dimension of relevance.

In some examples, one or more of these context appliances may be combined into a generic system that performs the functionality of one or more of the context appliances as a single system. Further, one or more context appliances may be combined, substituted or not included, additional context appliances may be configured, and the configuration may be performed statically, dynamically, or by the user (734).

Figure 7B:
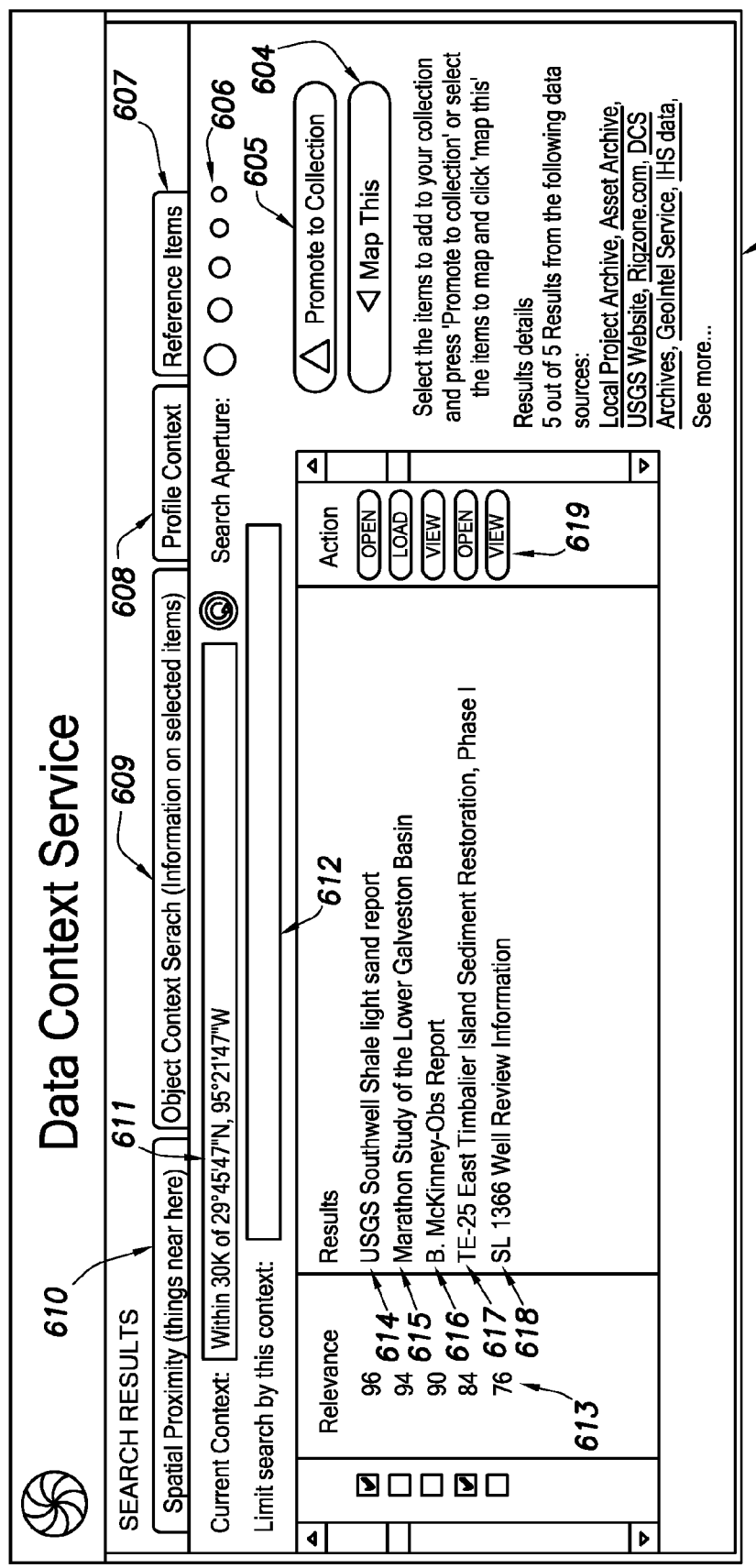
FIG. 7b shows an exemplary screen shot of a data context service window.

FIG. 7b shows the data context service window (603) in accordance with one or more embodiments of the invention. The data context service window (603) displays various search results that are organized into multiple pages. Each page may be retrieved using an associated tab.

FIG. 7b includes the spatial context search result page (610), the object context search result page (609), the profile context search result page (608), and the analog context search result page (607), which correspond to the spatial context appliance (720), the object context appliance (722), the profile context appliance (724), and the analog context appliance (726) of FIG. 7a, respectively. As an example, the spatial context appliance (720) obtains search results by evaluating geographical proximity of a search candidate (with both structured and unstructured formats) (with both structured and unstructured formats) with respect to a location of interest.

The evaluation may be performed as a distance ranking using a computer heuristic. For example, the search results presented in the spatial context search result page (610) include search results titled "USGS Southwell Shale light sand report" (614), "Marathon Study of the Lower Galveston Basin" (615), "B. McKinney—Obs Report" (616), "TE-25 East Timballer Island Sediment Restoration, Phase 1" (617), and "SL 1366 Well Review Information" (618). These search results are obtained based on a current context "Within 30 k of 29°45'47"N, 95°21'47"W" shown in the current context field (611), which describes a geographical region within a 30 kilometer distance from a location of interest specified as "29°45'47"N, 95°21'47"W". The location of interest may be the project location, the object location, or other location of interest within the oilfield operation project. Each of the search results (614)-(618) is obtained based on the current context due to at least one associated geographical location falling into the geographical region centered around the location of interest. Each search candidate may be selected because the geographical location is tied to the title, the context, or another aspect of the search candidate.

The spatial context search result page (610) also includes relevance measure (613) (e.g., relevance scores of 96, 94, 90, 84, 76) and an action item (619) (e.g., open, load, view) for each of the search results. The relevance measure may be a measure of geographical proximity of the associated geographical location to the location of interest. The scope of the search may be configured by the search aperture (606). For example, the distance of 30 kilometer may be adjusted by different settings of the search aperture (606).

As shown in FIG. 7b, action item (619) for each of the search results may be presented as selectable options for the user. For example, the search results (614) and (617) are depicted with a "OPEN" action, the search results (616) and (618) are depicted with a "VIEW" action, and the search result (615) is shown with a "LOAD" action. In another example, more than one available action may be selected for a research result. Although the action items depicted in FIG. 7b only include open, load, and view actions, those skilled in the art will recognize that other action items may be implemented for acting on the selected results. For example, a selected result may be saved as spreadsheet file, text file, Keyhole Markup Language (KML) file, Extensible Markup Language (XML) file, or other applicable formats. Furthermore, a selected result may be sent, for example to an email recipient.

In one or more embodiments of the invention, interfaces between the host application (710) and the context service engine (714) may be defined for operations such as view, load, save, send to and open. "Send to" refers to being able to gather all pertinent information related to selected data items and providing this information to a target application interface via a menu, at which point the information will be reformatted and appropriately used by the target application. Various implementations of these interfaces can then be registered with the host application (710) and will show up as options in the user interface, for example depicted in FIG. 7b. If the user selects one of these options (e.g., view, load, save, send to, and open), the host application (710) extracts the selected data from the current search result set and activates the registered implementation of the interface with the selected data. The implementation can then perform its desired operation (e.g., 'Save' to or 'Send to' a desired file format, etc.).

In one or more embodiments of the invention, each of the search results (614)-(618) may be selected for further actions, which may be activated by the action buttons (604) or (605). For example, the search results (614) and (617) are shown as being selected indicated by the check marks next to relevance scores of the relevance measure (613). The further actions may be a mapping function (604) or an archiving function (605). Although only two action buttons are illustrated in FIG. 7b, those skilled in the art will recognize any number of action buttons may be implemented for activating any number of further actions.

Figure 8A:
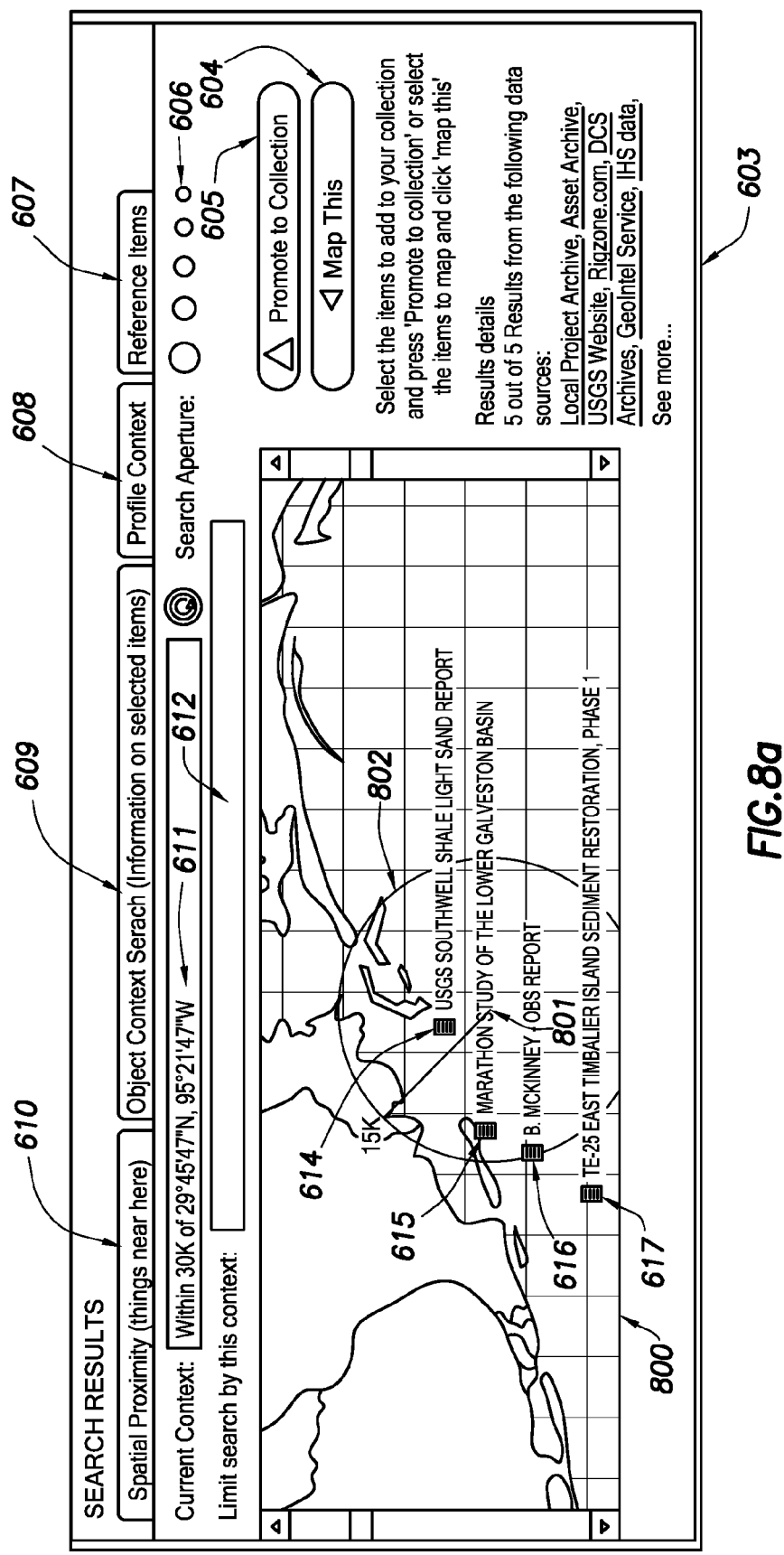

FIG. 8a shows the mapping function in accordance with one or more embodiments of the invention. As shown in FIG. 8a, the data context service window (603) includes multiple search results pages (607)-(610), the current context field, the search aperture (606), and the action buttons (604)-(605), which are essentially the same as those shown in FIG. 7b above. The search results (614)-(617) are displayed on a map (800) relative to a geographical region (802) centered around the location of interest (801) within a range of 15 kilometers. The adjustment of the search scope using the search aperture (606) is illustrated with the different range of 15 kilometers as compared to the range of 30 kilometers shown in FIG. 6b above. Based on this more restrictive spatial context, the search result (617) is shown as being excluded outside of the geographical region (802) and the search result (618) is shown as being excluded outside of the map (800). The archiving function (605) is described in detail later.

As described above, the search results presented in each of the search result pages in FIG. 7b may be obtained by corresponding context appliance. The object context search result page (609) presents search results obtained based on the object context appliance (722). As an example, the object context appliance (722) obtains search results by evaluating a relevance measure of a search candidate (with both structured and unstructured formats) with respect to a name, a serial number, or an identification of a wellsite, a wellbore, a process facility, a portion of the subterranean formation, a portion of the reservoir, or any other portion of the oilfield. In one example, the evaluation may be performed as a word pattern matched ranking using a computer heuristic.

The profile context search result page (608) presents search results obtained by the profile context appliance (724). As an example, the profile context appliance (724) obtains search results by evaluating a relevance measure of a search candidate (with both structured and unstructured formats) with respect to a name of the project, a role of the project, a name of the workflow, a role of the workflow, a title of the user, a role of the user, a name of the host application, or a role of the host application. The evaluation may be performed as a word pattern matching of names (e.g., of the project, the workflow, or the host application) in conjunction with a pre-determined relationship associated with a user title or roles (e.g., of the project, the workflow, the user, or the host application) using a computer heuristic. For example, a title "geophysicist" may be associated using a pre-determined relationship with a search candidate (with both structured and unstructured formats) having word pattern "geophysical survey report" in a title, content, or other attribute of the search candidate (with both structured and unstructured formats) to yield a high relevance measure. The profile context appliance has also the ability to identify and display the most relevant results for the given profile based on usage statistics performed on the collected information (900). In other words, the 'favorites' information of users having same profile will be displayed.

The analog context search result page (607) presents search results obtained by the analog context appliance (726). As an example, the analog context appliance (726) obtains search results by evaluating a relevance measure of a search candidate (with both structured and unstructured formats) with respect to a characteristic or attribute of data used in the host application (710) or the workflow (838). The evaluation may be performed by comparing the similarity between the host application data and data associated with a search candidate (with both structured and unstructured formats) using a computer heuristic. For example, the host application (710) may be a reservoir simulator calculating flow rate data and may be associated with a search candidate (with both structured and unstructured formats) having similar data to yield a high relevance measure.

The context search appliance and the context search result page may be supplemented with the use of new computer heuristics. For example, the time frame context search result page, although not shown in FIG. 7b, may be added to present search results obtained based on the time frame context appliance (728), which may be added to work with the context service engine (714). As an example, the time frame context appliance (728) obtains search results by evaluating temporal proximity of a search candidate (with both structured and unstructured formats) with respect to a project date, a workflow date, or an object date. The evaluation may be performed using a computer heuristic to identify any date related information associated with the search candidate (with both structured and unstructured formats) and compare it to the project date, the workflow date, or the object date. The date related information may be extracted from a title, content, time stamp, or other attributes associated with the search candidate (with both structured and unstructured formats).

Figure 8B:
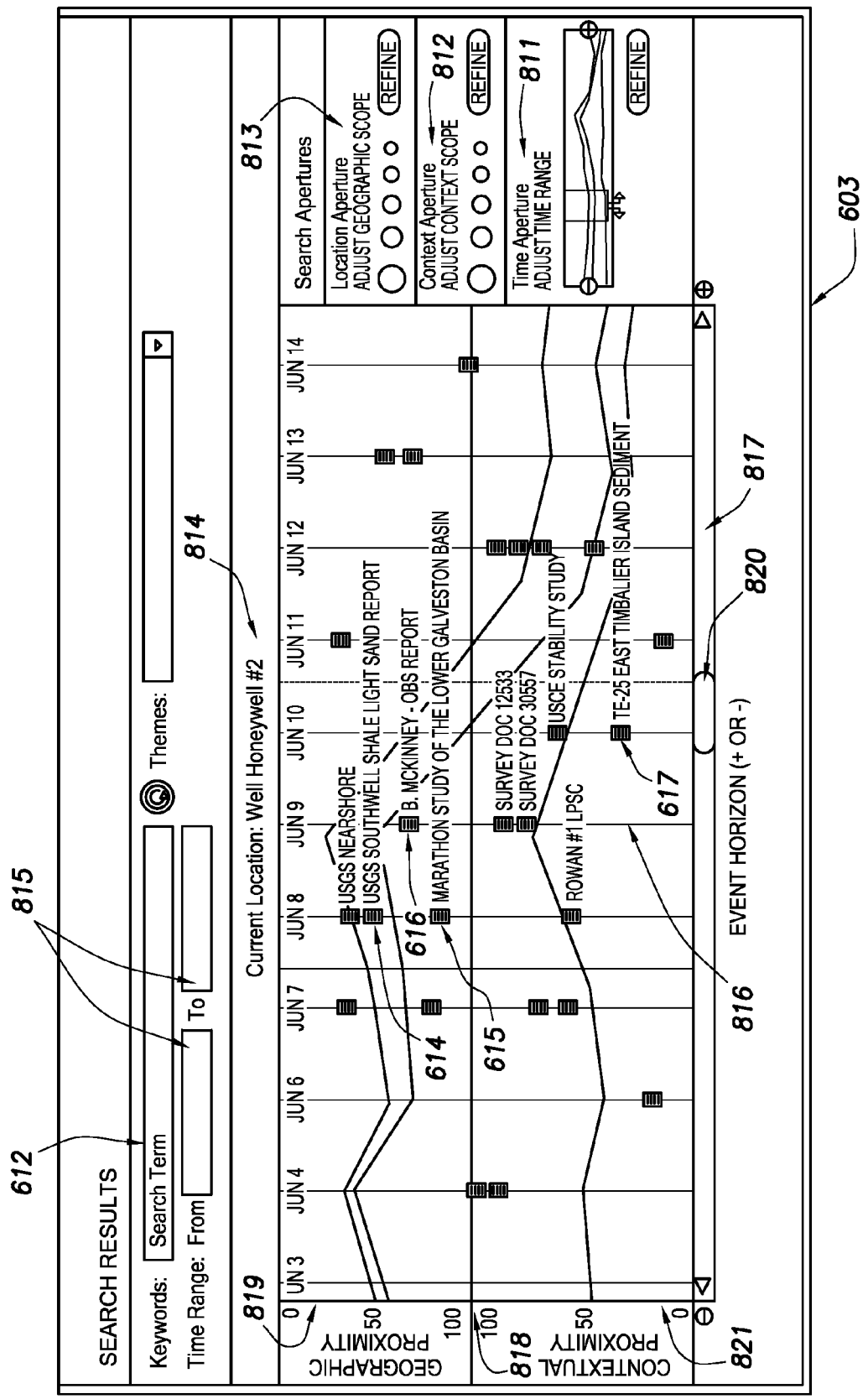

FIG. 5b shows an exemplary data context window in accordance with one or more embodiments of the invention. In FIG. 8b, a configuration is shown where the data context window (603) presents search results obtained by using a combination of multiple context appliances. For example, the search results (614)-(617) are obtained by using the spatial context appliance in essentially the same way as illustrated in FIG. 7b above. These search results (614)-(617) are presented along a temporal scale (817) with respect to date information extracted from the search results using computer heuristic embedded in the time frame context appliance (728). The time frame context appliance (728) also evaluates the relevance measure based on temporal proximity to a date of interest (816), which may be a project date, a workflow date, or an object date as described above.

In the example shown in FIG. 8b, the location of interest and the date of interest may be both related to an object indicated by the label "Well Honeywell #2" (814). The temporal scale (817) may be adjusted based on user defined time range (815) and a user controlled slider (820). Additionally, the relevance measure "geographic proximity" generated by the spatial context appliance is presented using a positive axis (819) from a base line (818) in the data context service window (603). The relevance measure "contextual proximity" generated by another context appliance is presented using a negative axis (821) from the base line (818) in the data context service window (603). The another context appliance may be anyone of the time frame context appliances (722)-(728). The scope of the spatial context based search may be adjusted by the location aperture (813). The scope of the search using the another context appliance may be adjusted by the context aperture (812). The scope of the time frame context appliance may be adjusted by the time aperture (811). Further, the data context service window (603) also includes a user defined search field (612) for limiting the search results by supplementing the context appliances with a user provided search key word.

FIG. 9 (which is divided into FIGS. 9A and 9B) shows another exemplary data context window configuration where the data context window (603) is supplemented with a collected information section (900). The data context window (603) is essentially the same as shown in FIG. 7b above. The collected information section (900) displays contents of a shared data repository containing previous search results (i.e., a search results repository), which is shared among multiple projects within an asset team or a corporation. For example, the multiple projects may include the first project (730) and the second project (732) described with respect to FIG. 7a above. The previous search results may be obtained within the first project (730) and collected into the data repository shared within a particular group (e.g., project team repository shared within a project team (901), asset team repository shared within an asset team (902), corporate repository shared within the corporation (903), etc.) to which the search results are deemed relevant by the user. The previous search results may be collected into the data repository by activating the archiving action button (605). In addition, search results details (907) may be included to provide information (e.g., the nature and range) regarding the search to users within the sharing group.

In one or more embodiments of the invention, in the shared environment, each of the collected previous search results may be annotated with notes (904) (e.g., information note, quality tag, other annotation explaining the relevance or confidence of the data, etc.), rated with rating (906), and/or associated with available actions (905). The rating (906) allows users within the sharing group to tag the search results deemed valuable and promote value added knowledge capture. The actions (905) may include a similar action as action item (619) described with respect to FIG. 7b above as well as additional actions applicable in the sharing environment such as share, annotate, send to, or other applicable actions. These actions (905) allow instant and appropriate action based on the context and content of the search results (e.g., data or document).

In one or more embodiments of the invention, the annotated with notes (904) and rate with rating (906) may compose another context information category and as such a new computer heuristic may be devised to supplement the data context service window with additional context appliance and context search result page (not shown). The relevance measure generated from original context search appliances may be further adjusted or revised based on this addition.

Figure 10:
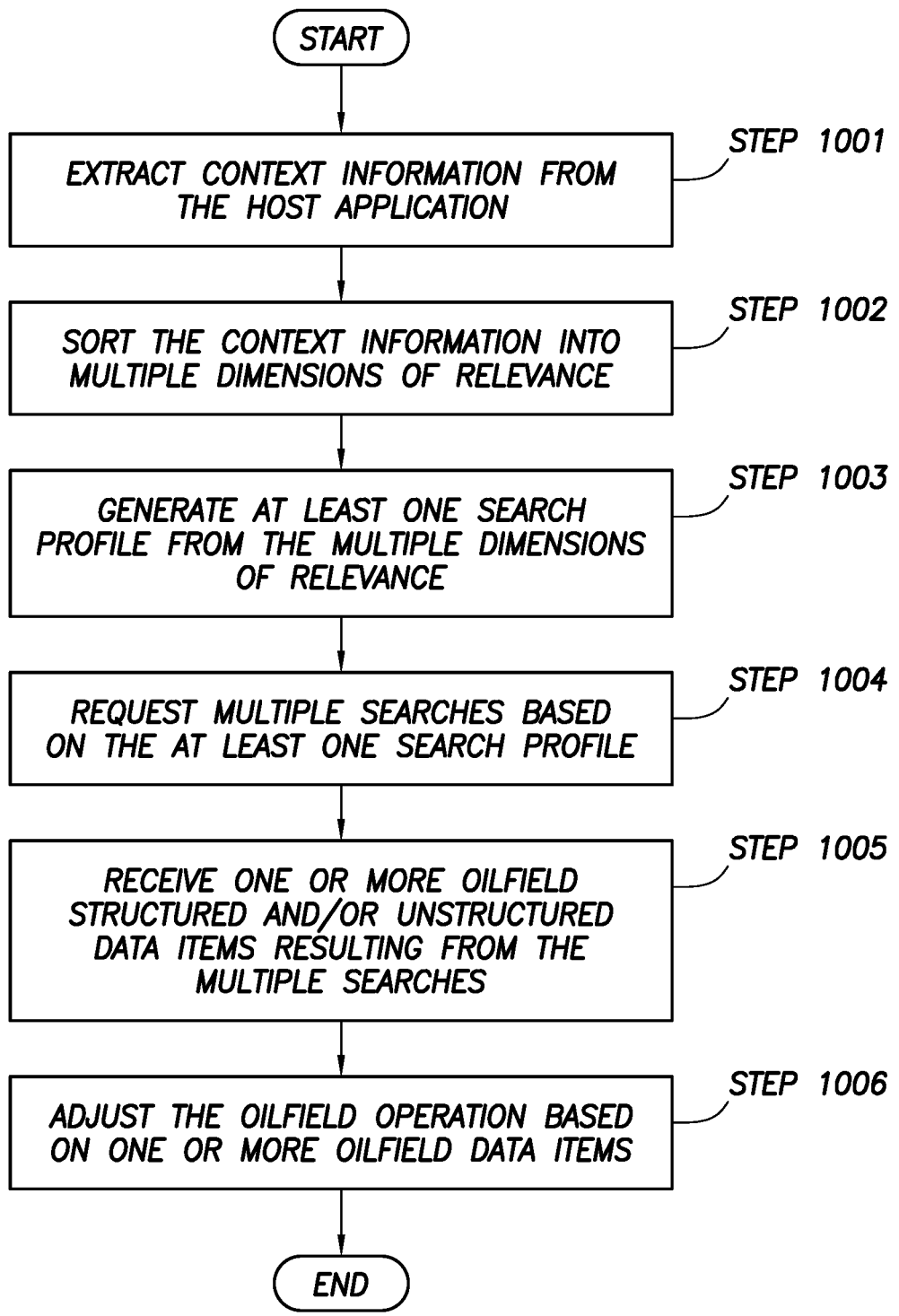
FIG. 10 is a flowchart depicting a method of using the data context service in performing the oilfield operation.

FIG. 10 is a flowchart depicting a method of using the data context service from within the a host/user application to perform the oilfield operation in accordance with one or more embodiments of the invention. As described, the oilfield operation may be performed in a workflow of a project using a host application. Initially, the context information associated with the project is extracted from within the host application (Step 1001). The extracted context information is sorted into multiple dimensions of relevance (Step 1002). Then, at least one search profile is generated from the multiple dimensions of relevance (Step 1003). A separate search profile may be generated from each of the dimensions of relevance. A search profile may provide some portion of the search criteria based on which search for oilfield data items is performed. In Step 1004, multiple searches are requested based on at least one search profile. In Step 1005, one or more oilfield data items (of structured and/or unstructured formats) are received as result from the multiple searches.

Upon receipt of the results, one or more oilfield data items may be stored in a shared data repository (e.g., a hierarchical data base, a relational database, a binary tree structure, etc.). The oilfield data items associated with the shared data repository may be managed (e.g., data item(s) added, modified, deleted, transferred, etc.). In Step 1006, the oilfield operation is adjusted based on one or more of the received oilfield data items. Optionally, the search results can be archived in a data repository to be shared by another project of the oilfield operation.

The steps of portions or all of the process may be repeated as desired. Repeated steps may be selectively performed until satisfactory results achieved. For example, steps may be repeated after adjustments are made. This may be done to improve the relevance measure of the search results and/or to determine the impact of changes made.

The search aperture, user defined search field, layout of the search result page, available action and action buttons defined in the data context service window provide flexibility to the context based search process. These factors of the various context search result page and corresponding context appliances are selected to meet the requirements of the oilfield operation. Any combination of context appliances may be selectively linked or combined to create the overall search result for the oilfield operation. The process of linking the context appliances may be re-arranged and context based search repeated using different configurations. Depending on the type of computer heuristics and/or the arrangement of the context appliances and/or the shared search result repository, the context based search may be configured to provide the desired results. Various combinations may be tried and compared to determine the best outcome. Adjustments to the context based search may be made based on the oilfield, the workflow, the host application, and other factors. The process may be repeated as desired.

It will be understood from the foregoing description that various modifications and changes may be made in the preferred and alternative embodiments of the present invention without departing from its true spirit. For example, additional context information categories, context appliances, and context search result pages may be added as new computer heuristics are devised. The context information may be automatically extracted or supplemented with user provided information. The context based search may be repeated according to the various configurations and the search results compared and/or analyzed.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method of performing an oilfield operation, comprising:
    identifying an oilfield simulator used by an oilfield project during a plurality of workflows for performing the oilfield operation;
    extracting, by a processor of a computer system, contextual information comprising a plurality of identifiers, a plurality of locations, and a plurality of time points associated with at least one selected from a group consisting of a user, the oilfield project, each of a plurality of oilfield objects associated with the oilfield project, and each of the plurality of workflows associated with the oilfield project;
    obtaining a first search result by evaluating a first relevance of one or more oilfield data items with respect to at least one of the plurality of locations;
    obtaining a second search result by evaluating a second relevance of the one or more oilfield data items with respect to at least one of the plurality of oilfield objects;
    obtaining a third search result by evaluating a third relevance of the one or more oilfield data items with respect to at least one of the plurality of identifiers;
    obtaining a fourth search result by evaluating a fourth relevance of the one or more oilfield data items with respect to at least one of the plurality of time points;
    obtaining a fifth search result by evaluating a fifth relevance of the one or more oilfield data items with respect to a plurality of data items generated by the oilfield simulator;
    displaying each of the first search result, the second search result, the third search result, the fourth search result, and the fifth search result in a user interface window of the oilfield simulator; and
    selectively adjusting the oilfield operation based on displaying the first search result, the second search result, the third search result, the fourth search result, and the fifth search result.

2. The method of claim 1,
    wherein the one or more oilfield data items comprise both structured and unstructured sets of results.

3. The method of claim 1, wherein at least one of the first search result, the second search result, the third search result, the fourth search result, and the fifth search result is from a search conducted by a third-party appliance.

4. The method of claim 1, wherein the one or more oilfield data items comprise structured data and unstructured data.

5. The method of claim 1, wherein at least one of the one or more oilfield data items is associated with an action item in the oilfield simulator, the action item being selected from a group consisting of view, load, share, annotate, send to, and open.

6. The method of claim 1, wherein the oilfield operation is at least one selected from a group consisting of a survey operation, a drilling operation, a simulator operation, and a processing operation.

7. A system for performing an oilfield operation, comprising:
 a processor;
 an oilfield simulator executing on the processor and used by an oilfield project during a plurality of workflows for performing the oilfield operation; and
 memory comprising instructions, when executed causing the processor to:
  extract context information comprising a plurality of identifiers, a plurality of locations, and a plurality of time points associated with at least one selected from a group consisting of a user, the oilfield project, each of a plurality of oilfield objects associated with the oilfield project, and each of the plurality of workflows associated with the oilfield project;
  obtain a first search result by evaluating a first relevance of one or more oilfield data items with respect to at least one of the plurality of locations;
  obtain a second search result by evaluating a second relevance of the one or more oilfield data items with respect to at least one of the plurality of oilfield objects;
  obtain a third search result by evaluating a third relevance of the one or more oilfield data items with respect to at least one of the plurality of identifiers;
  obtain a fourth search result by evaluating a fourth relevance of the one or more oilfield data items with respect to at least one of the plurality of time points;
  obtain a fifth search result by evaluating a fifth relevance of the one or more oilfield data items with respect to a plurality of data items generated by the oilfield simulator; and
  selectively adjust the oilfield operation based on a display of the first search result, the second search result, the third search result, the fourth search result, and the fifth search result; and
 a display unit configured to display each of the first search result, the second search result, the third search result, the fourth search result, and the fifth search result in a user interface window of the oilfield simulator.

8. The system of claim 7, further comprising:
 a shared repository for storing the one or more oilfield data items.

9. The system of claim 7, wherein the one or more oilfield data items comprise structured data and unstructured data.

10. The system of claim 7, wherein at least one of the one or more oilfield data items is associated with an action item in the oilfield simulator, the action item being selected from a group consisting of view, load, share, annotate, send to, and open.

11. The system of claim 7, wherein the oilfield operation is at least one selected from a group consisting of a survey operation, a drilling operation, a simulator operation, and a processing operation.

12. A non-transitory computer readable medium storing instructions for performing an oilfield operation that, when executed by a processor, cause the processor to perform operations comprising:
 identify an oilfield simulator used by an oilfield project during a plurality of workflows for performing the oilfield operation;
 extract contextual information comprising a plurality of identifiers, a plurality of locations, and a plurality of time points associated with at least one selected from a group consisting of a user, the oilfield project, each of a plurality of oilfield objects associated with the oilfield project, and each of the plurality of workflows associated with an oilfield project;
 obtain a first search result by evaluating a first relevance of one or more oilfield data items with respect to at least one of the plurality of locations;
 obtain a second search result by evaluating a second relevance of the one or more oilfield data items with respect to at least one of the plurality of oilfield objects;
 obtain a third search result by evaluating a third relevance of the one or more oilfield data items with respect to at least one of the plurality of identifiers;
 obtain a fourth search result by evaluating a fourth relevance of the one or more oilfield data items with respect to at least one of the plurality of time points;
 obtain a fifth search result by evaluating a fifth relevance of the one or more oilfield data items with respect to a plurality of data items generated by the oilfield simulator;
 display each of the first search result, the second search result, the third search result, the fourth search result, and the fifth search result in a user interface window of the oilfield simulator; and
 selectively adjust the oilfield operation based on displaying the first search result, the second search result, the third search result, the fourth search result, and the fifth search result.

13. The computer readable medium of claim 12, the instructions further comprising instructions to:
 manage one or more oilfield data items associated with a shared data repository.

14. The computer readable medium of 13, the instructions further comprising functionality to:
 assign a rating to one or more oilfield data items in the shared data repository.

15. The computer readable medium of claim 12, the instructions further comprising functionality to:
 expose one or more oilfield data items aggregated based on the plurality of dimensions of relevance in a same interface, wherein one or more oilfield data comprise both structured and unstructured sets of results.

16. The computer readable medium of claim 12, wherein instructions comprising functionality to extract contextual information comprises extracting a state from a current state of a user in the host application.

17. The computer readable medium of claim 12, wherein the contextual information comprises at least one selected from a group consisting of spatial information associated with the oilfield project, a workflow associated with the oilfield project, an oilfield object associated with the oilfield project, a time frame associated with the oilfield project, an analog context associated with the oilfield project, and a user role in the oilfield project.

18. The computer readable medium of claim 12, wherein at least one of the one or more oilfield data items is associated with an action item in the host application, the action item being selected from a group consisting of view, load, share, annotate, send to, and open.

19. The computer readable medium of claim 12, wherein the oilfield operation is at least one selected from a group consisting of a survey operation, a drilling operation, a simulator operation, and a processing operation.

* * * * *